US000001221H

United States Statutory Invention Registration [19]

[11] Reg. Number: H1221

Best et al.

[43] Published: Aug. 3, 1993

[54] HIGH SPEED, SMALL DIAMETER DISK STORAGE SYSTEM

[76] Inventors: John S. Best, 6486 Oakcrest Dr., San Jose, Calif. 95120; Timothy J. Chainer, R.D. #1, Barrett Hill Rd., Mahopac, N.Y. 10541; Thomas W. Glaser, Rte. 8, Box 183, Rochester, Minn. 55902; Richard Greenberg, 748 Northern Hills Dr. NE., Rochester, Minn. 55904; Avijit Mukherjee, 7143 Anjou Creek Cir., San Jose, Calif. 95120; Jerry L. Neubauer, 706 4th Ave. SE., Stewartville, Minn. 55976; John R. Reidenbach, 3001 5th Ave. NW.; Robert E. Schopp, 2712 17th Ave. NW., both of Rochester, Minn. 55901; Robert A. Scranton, 20242 Viewcrest Ct., San Jose, Calif. 95120

[21] Appl. No.: 808,918

[22] Filed: Dec. 18, 1991

Related U.S. Application Data

[63] Continuation of Ser. No. 502,215, Mar. 30, 1990, abandoned.

[51] Int. Cl.[5] ..... G11B 5/012

[52] U.S. Cl. ..... 360/97.01; 360/98.07; 360/99.08

[58] Field of Search ..... 360/97.01, 99.08, 98.07; 371/49.1

*Primary Examiner*—Bernarr E. Gregory

[57] ABSTRACT

A high speed, small diameter disk storage system having a plurality of disk drive devices utilizing disks with a nominal 65 mm diameter rotated at a speed of approximately 10,000 RPM which can be optimally arranged in a four drive system to match the space geometry of the traditional half-high flexible disk drive used in a personal computer.

24 Claims, 19 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DRIVE ELECTRONICS

HIGH SPEED, SMALL DIAMETER DISK STORAGE SYSTEM

This application is a continuation of U.S. application Ser. No. 07/502,215, filed Mar. 30, 1990, entitled "High Speed, Small Diameter Disk Storage System", to the same assignee, now abandoned.

TECHNICAL FIELD

Disk storage devices represent the preferred approach to the problem of storing large amounts of data and program information for use by computers. Since their introduction over 30 years ago, they have been continually improved to provide greater storage capacity, shorter actuator access times, reduced latency and recovery from a disk failure to provide improved reliability. This has been accomplished while reducing the space occupied by such devices and the power consumed.

BACKGROUND ART

The rate of performance of disk storage devices has not kept pace with the improvements made in other aspects of data processing systems. In the more recent past, while the access times have decreased by a factor of 2 or 3 and data rates have improved by a factor of 2, there presents an ever widening gap between the performance of data processing units and the disk storage system. To a large extent, this is due to the existence of physical laws which require increasing amounts of energy to move mechanical components at higher velocities.

Overall storage system performance can be characterized by the amount of time required to retrieve a typical amount of data, say 16 kilobytes (KB). In the last five years, this time has decreased by a factor of 3. In the same period, the performance of solid state components of the system has improved by a factor of 10. This disparity shows no signs of improving, and more likely, will continue to worsen.

Looking at performance in terms of a midrange data processing system, which is typically used to service a large number of terminals, approximately 60% of the time is consumed by the storage subsystem. Typically, each user transaction requires about 20 disk operations, each of which transfer about 4 KB of data. This type of system provides a response time to the terminal operator of 1 to 2 seconds, which, while it is the actual value typically encountered, is not considered to be ideal by the typical terminal operator.

It can be seen that the response time is largely limited by the performance of the storage subsystem, and this will be even more the case as the performance gap between solid state devices and disk storage systems continues to widen. Adding to the severity of the problem is the fact that future applications are likely to be more complex and require more data to be transferred. The number of disk operations per user transaction is projected to rise from 20 to 40 and the average data transfer rate will increase from 4 KB to 20 KB.

The problem is further complicated by the fact that data processing systems are becoming a more essential and integral part of every day business and personal life. As such, it is no longer convenient, or even possible, for a user to wait for a skilled service representative to make a repair within a day or so. In most cases, the system will have to be restored to service within a matter of minutes, or at best, an hour or two, or valuable business will be lost. This means that the trouble shooting and repair or replacement of the defective unit will be done by the user himself.

Various approaches to the design problems of latency, size, power consumption, data rate, bit density, track density, serviceability and reliability of disk storage devices have been employed in the past. U.S. Pat. No. 3,876,978 assigned to the assignee of this invention describes a storage system having multiple units. One of the units is utilized to store a parity bit which is based on the data in the corresponding bit positions for each of the respective units. As described, the system relates to a tape cartridge system in which one cartridge is used to represent the parity bit resulting from a comparison of the corresponding bit in all the other cartridges. If a single cartridge is lost, the data can be regenerated by reading all the bits from all the data cartridges, combining and comparing the result of the corresponding bit in the parity cartridge and regenerating the data to produce the proper parity. The approach used in this patent, with but a single access mechanism, is well suited to use in a multiple disk drive system. In a disk drive system it would be desirable to perform an on-line check of the validity of all data read from the system as well as regenerate lost data. The use of the system described in the patent would not provide satisfactory performance for on-line checking of data read from the disk system.

The system described in U.S. Pat. No. 4,036,659 is representative of programmed controllers for disk drive systems. The very lengthy and highly detailed description for distributing data among a plurality of disk drives does not suggest the use of exceptionally small disks operating on very high rotational speed.

U.S. Pat. No. 4,568,988 describes a disk storage system utilizing disks in the range of 85–100 mm (96 mm) in diameter. The system uses an open loop track accessing system and operates at the conventional 3,600 RPM. The patent does not suggest that any advantage could be obtained by combining a plurality of such systems and distributing the data over all the drives in the system. Further, the suggested range of disk diameter does not extend below 85 mm.

The video recording system described in U.S. Pat. No. 4,577,240 relates to a disk storage system which uses separate actuators to record the problems of error correction or recovery from a disk failure. The tracks which contain flaws which would otherwise produce errors are simply skipped. In actual data processing practice, this would lead to an intolerable loss of data capacity since single bit errors would result in the loss of an entire track. This is an unacceptable trade-off when applied to the problem of data storage. The patent also fails to suggest the use of more than one drive spindle, using separate actuators instead. This approach does not lend itself to the simple replacement of a failing unit since two actuators, and therefore also two groups of data, would be involved.

The use of multiple spindles in a disk storage system is suggested by U.S. Pat. No. 4,583,133. However, in this system only one drive is in use at a time. There is no teaching that the data could be simultaneously apportioned and recorded among all the units. The use of flexible media, rather than a hard disk, is contemplated, and there is no mention that the rotational speed is other than the low speed which is conventional for flexible media.

The teaching of U.S. Pat. No. 4,724,495 is directed to a video recording system using two separate actuators for recording successive video fields on different zones of the disk storage stack. There is no suggestion that separate spindles be used and the data simultaneously recorded on more than one spindle. This system handles defects in a track by simply skipping the entire track, similar to the approach shown in U.S. Pat. No. 4,577,240 discussed above. The spindle speed is specified as either 3,000 or 3,600 RPM. The patent does not suggest that a plurality of small disks be combined in a system in which the data is distributed across all the disks in parallel fashion.

Despite the attractive characteristics of such devices, there are some inherent limitations which have not been overcome. For example, the fact that data is arranged serially along a circular track makes it necessary to wait until the desired data passes under the data transducer. From a simple statistical standpoint, the average time required for the desired data to reach a transducer will be the period of time for one-half revolution of the disk. It is possible to modestly improve the simple statistical average latency by skewing the sectors from one track to another. This may allow a transducer to begin reading a track somewhat sooner after a track access than would otherwise be the case. The waiting time for the data to come under a transducer is referred to as latency.

While the time required for mechanical movement of the head-arm assembly during a track-to-track access has been substantially reduced with faster and faster actuators, there has been little improvement in the latency. This is easily understood when disk drive specifications are examined. The so-called "hard" drives, that is, those which utilize a rigid substrate, invariably rotate at 3,600 revolutions per minute. Since latency is inversely and directly related to rotational speed, it is not possible to make substantial improvements unless the rotational speed is increased.

It would seem to be a simple matter to speed up the spindle drive motor, and thereby reduce latency; however, such is not the case, as evidenced by the absence of disk drives of higher rotational speed. Some of the problems are obvious, even though they do not lend themselves to obvious solutions. For example, the so-called "Winchester" technology which provided for aerodynamic control of the head to maintain the head-disk spacing in the region of 8 to 25 microinches, relies on the existence of a thin film of air moving at a velocity of 600–1,000 inches per second. With disks rotating at 3,600 RPM and having a diameter of 3.5 to 8 inches or greater, this velocity requirement is easily satisfied and "sliders", which are the transducers arranged in an aerodynamic package, can be designed to operate satisfactorily for these parameters.

It has been long recognized that latency is directly related to rotational speed, and there is a direct benefit in the reduction of latency as a result of increasing rotational speed. Nevertheless, the rotation speed of virtually all hard disk drive systems has remained in the 3,000 to 3,600 RPM range.

This is at least partially explained by the fact that, for example, tripling the speed to approximately 10,000 RPM, to obtain a worthwhile improvement in latency, represents a drastic departure from existing slider technology. Such a departure could require a costly redesign of the slider to accommodate the altered aerodynamic situation resulting from the increased disk velocity.

The aerodynamic problem is predictable and presumably could be solved with sufficient engineering effort. Such is not the case with other problems. It has been recognized that the occasional contact between the head and the disk can lead to premature failure of the device if appropriate precautions are not taken. It is possible to design mechanisms which position the transducer over the "landing" zone, where no data is stored, when the disk is started and stopped. This eliminates a portion of the wear and potential damage to the disk surface over which data is stored. There is still the potential for inadvertent contact between the transducer and the disk during normal reading and writing of data. Thus, even where economic justification exists for the cost of special mechanisms to position the transducer of the landing zone, it is desirable to have some form of protection on the disk surface. Typically this protection takes the form of a lubricant which is applied to the surface of the recording media on the disk.

The development of suitable lubricants has been difficult. The requisite lubrication characteristics eliminate all but a few classes of lubricants. In addition, the lubricant must not interact with contaminants to form physical structures which would interfere with the contaminants found in the usual business or home environment to form molecules, crystalline or amorphous structures which approach a substantial portion of the normal head-disk spacing, it is possible that the head would come into contact with the structure leading to a "head crash" and resulting damage to the disk surface and loss of data. Not only must the lubricant be satisfactory from the lubrication and chemical standpoint, it must also possess certain physical characteristics which cause it to adhere to the disk surface and not be spun off. It has been found that some lubricants which possess the desired chemical and lubrication characteristics are prone to migration to the periphery of the disk as a result of the centrifugal force. Since this failure mode appears only after long periods of operation, it is difficult to evaluate and test lubricants for satisfactory performance. Lubricants which operate to produce satisfactory disk life at rotational speed of 3,600 RPM would require, at a minimum, extensive life testing to verify their acceptability at higher rotational speeds. The likely result of such testing would indicate that existing lubricants are not satisfactory for use at substantially higher speeds.

It is therefore understandable that rotational speed have remained fixed at 3,600 RPM since the foreseeable problems and unpredictable results which would arise from higher speeds constitute a substantial deterrent to the investment in development.

If higher speeds were to be attempted it would be anticipated that the heat dissipated within the drive would lead to problems. The increased amount of power needed to rotate the disk at higher velocity would necessarily lead to a larger spindle drive motor with its attendant greater power dissipation. This is not a trivial problem when it is recognized that the increased power dissipation would be within a very small volume, making dissipation of the heat even more difficult. It could also be anticipated that there would be increased windage losses and this would also contribute to the heat developed within the device.

Since space is always a consideration, the larger drive motor would be a substantial deterrent to the use of higher rotational speeds. This is particularly the case in the so-called personal computers, in which the disk drive already occupies an inordinate fraction of the available space and power. With the trend toward increasing small personal computers, a disk drive which would occupy more space than existing disk drives would not be acceptable. Additional space would very likely be required for the heat sinking of the higher speed unit.

Even if it were possible to increase rotational speed for the purpose of improving latency, such a development would inevitably lead to an effort to improve the actuator access time and this would also tend to increase the power dissipated within the device.

The prior art bears ample evidence of the contradiction which exists between the efforts to improve latency and the other requirements for disk drives. The greater power and size of the device which would have improved latency contradicts the requirement that devices be made ever smaller, consume less power and run cooler. On top of all this are the inherent requirements that the device be more reliable and be less expensive.

Another problem which has not been successfully addressed in the prior art relates to the repair and/or replacement of defective disk drives. This task has traditionally required a high degree of skill, well beyond that of the average personal computer user. The repair of hard disk drives is even more critical than the less sophisticated flexible disk drive because of the nature of the data stored on the respective types. Typically the hard disk will contain all the application programs used on the system and it may also contain the bulk of the data. Because of the critical nature of the information on the hard drive, it is customary to periodically perform a "back up" operation, which is essentially a duplication of the data on the hard disk on a flexible disk or tape type device. The flexible disk or tape can be used to recover the data if the hard disk should be damaged or otherwise become inoperable.

While the disk drives are designed to perform error correction on erroneous data, the power of such error correction capability is customarily severely limited and cannot handle the loss of large blocks of data which result from a head crash of even modest proportions.

The back up operation is a nuisance to perform and the requirement for a back up is frequently ignored until after the hard drive fails, when it is too late to do anything about recovering the data. The replacement of a disk drive is often a complex task, involving considerable expertise in both the mechanical aspects of removal and replacement of the drive, as well as software knowledge to format the disks and reload such information as may still be available.

An additional problem with the prior art disk storage systems relates to the material used for the disk substrate. Aluminum has been the material of choice almost from the outset of the technology. Aluminum offers the advantage of light weight, good machineability and strength. At previous values of magnetic media thickness and head flying heights, the aluminum substrate could be turned to an adequate finish with conventional, albeit it expensive, machining techniques. However, even with the most advanced machining equipment, the surface finish on an aluminum substrate includes imperfections which are beyond the tolerance for the thin media coatings necessary to improve bit and track density.

The surface finish must be quite perfect to provide an error free disk. After a disk has been coated with magnetic media, the surface can be finished to a very fine surface. While this reduces the severity of the problem with head crashes, the existence of minute projections or pits in the substrate will result in bit drop outs in the region of projections and bit spreading in the region of pits even though the surface of the media is virtually perfect. The most advanced techniques for finishing the surface of aluminum substrates approach the theoretical limits of the material. The use of pure aluminum provides the best potential for a good finish since it does not contain the impurities and inclusions common to aluminum alloys. Unfortunately, pure aluminum is quite soft and the machineability is so poor that it limits the quality of the surface that can be obtained. Other materials have been evaluated for use as substrates. Both glass and semiconductor grade silicon have been used. Either material provides the potential of a much better surface finish than can be obtained with aluminum. Ceramic substrates may also be used. However, these alternatives are more brittle than aluminum. This characteristic has prevented their widespread use, particularly in the type of drive which is used in the personal computers, which must be relatively more rugged to stand the abuse of relocation by unskilled persons. Additionally, the mechanical strength of ceramics, glass and semiconductor silicon, which is adequate to withstand shock and the stresses of operation at the present rotational speeds, become suspect when the speed is increased to much higher values.

While the performance of the actuators which position the transducer over the desired track has been continuously improving to provide ever faster access times, the improved performance has come largely at the expense of greater expenditure of power. This produces complications for the overall computer system in terms of a higher capacity power supply, reduced operating time for battery operated systems, and additional heat produced within the drive.

It has been discovered that the performance of large systems using high performance disk drives reaches a constraint imposed by the vast amount of data which is accessible by each actuator. Because access to the data on each such drive necessarily proceeds in serial fashion, there is an unavoidable delay associated with the retrieval of data. While this limitation could be avoided by placing less data under each actuator, the high cost of each actuator and the associated components of the disk drive system have made such an approach economically impractical. In other words, it does not make sense to utilize a high cost actuator unless it is combined with a large amount of data. The goal of a high speed actuator to access relatively smaller amounts of data has not been realizable in a commercial environment.

Further, while the advantages of having less data under each actuator have been recognized, past approaches to this problem have suffered from the loss of reliability due to the existence of additional actuators.

In summary, it would be desirable to have a disk drive system which provided improved latency, but which is smaller and uses less power than existing devices. The device would ideally utilize as much of the existing disk drive technology as possible to allow use of existing lubricants and slider technology. These improvements would ideally be accompanied with improved actuator performance to accompany the reduced latency. All of this should be accomplished without reduced reliability. Preferably the system should allow the customer to replace defective portions of the disk system without the use of complex tools, special mechanical skills or programming skills beyond those possessed by an average user.

DISCLOSURE OF THE INVENTION

An object of this invention is to provide a hard disk storage system with reduced latency.

Another object of this invention is to provide a disk storage system incorporating substrates of glass, glass ceramic, ceramic or semiconductor grade silicon having an improved surface finish.

Another object of this invention is to provide a higher capacity, but smaller, hard disk storage system having higher track density and greater lineal bit density than existing personal computer disk storage systems.

Still another object of this invention is to provide a hard disk storage system which corresponds to a submultiple of the standard size of a 5¼ hard disk storage system.

A further object of this invention is to provide a disk storage system having increased capacity and improved performance without a corresponding increase in power consumed by the system.

An additional object of this invention is to provide an improved actuator access time without increasing the power required by the actuator.

A still further object of this invention is to provide a multiple drive disk storage system which is more reliable than a single drive system.

A still further object of this invention is to provide a multiple drive disk storage system in which individual drives may be connected and disconnected without the need for powering down the system and without loss of data.

Still further, an object of this invention is to provide a disk storage system, having four drives, in which the failure of one drive does not result in the loss of data or substantially impaired performance.

An additional object of this invention is to provide improved access time without the requirement for additional actuator power or increased cooling for the disk storage system.

A still additional object of this invention is to provide a disk storage system in which a high speed, low cost, actuator can be used to access relatively smaller amounts of data to permit higher speed retrieval of data by parallel retrieval of data.

A still additional object of this invention is to provide a disk storage system which reduces the amount of data which is accessible with each actuator without suffering a loss in actuator speed or reduced system reliability.

Another object of the invention is to provide a disk storage system which, although it incorporates small diameter disks, is able to utilize existing slider technology by developing a conventional air film with a substantially increased rotational speed.

This invention utilizes a disk having a diameter of 65 mm or less, preferably fabricated from glass, glass ceramic, ceramic or semiconductor silicon, rotating at 10,000 RPM, packaged to allow four such devices to be mounted in the physical space occupied by a standard 5¼" disk drive such as used in personal computers.

Because of the reduced disk substrate size, the stress related problems which exist with the use of glass, glass ceramic, ceramic and semiconductor silicon are largely overcome and much higher rotational speed are permissible. The improved surface finish achievable with glass and silicon substrates permits higher track and bit density. The shorter distances required for track access makes it possible for shorter access time. Not only is the distance to move reduced, but there is an unforeseen advantage in the shorter suspension length of the transducer support arm which reduces the mass required to be moved, as well as the moment of inertia of the arm assembly.

Even further, the increased rotational speed not only reduces the latency period, but it generates a relative disk to head velocity which is within the range now utilized in larger disk drives thereby permitting the use of existing slider aerodynamic designs.

The small size of the device allows four units to be mounted within the space usually required for a standard 5¼" disk drive. With four units available it is possible to allocate and store a portion of each byte of information on each drive, along with sufficient error correction information to permit regeneration of the data from any three of the four drives. In this fashion, the advantages of smaller amounts of data under each actuator are retained without the attendant exposure to more frequent failures which would normally result from the use of multiple drives.

Figure 11:
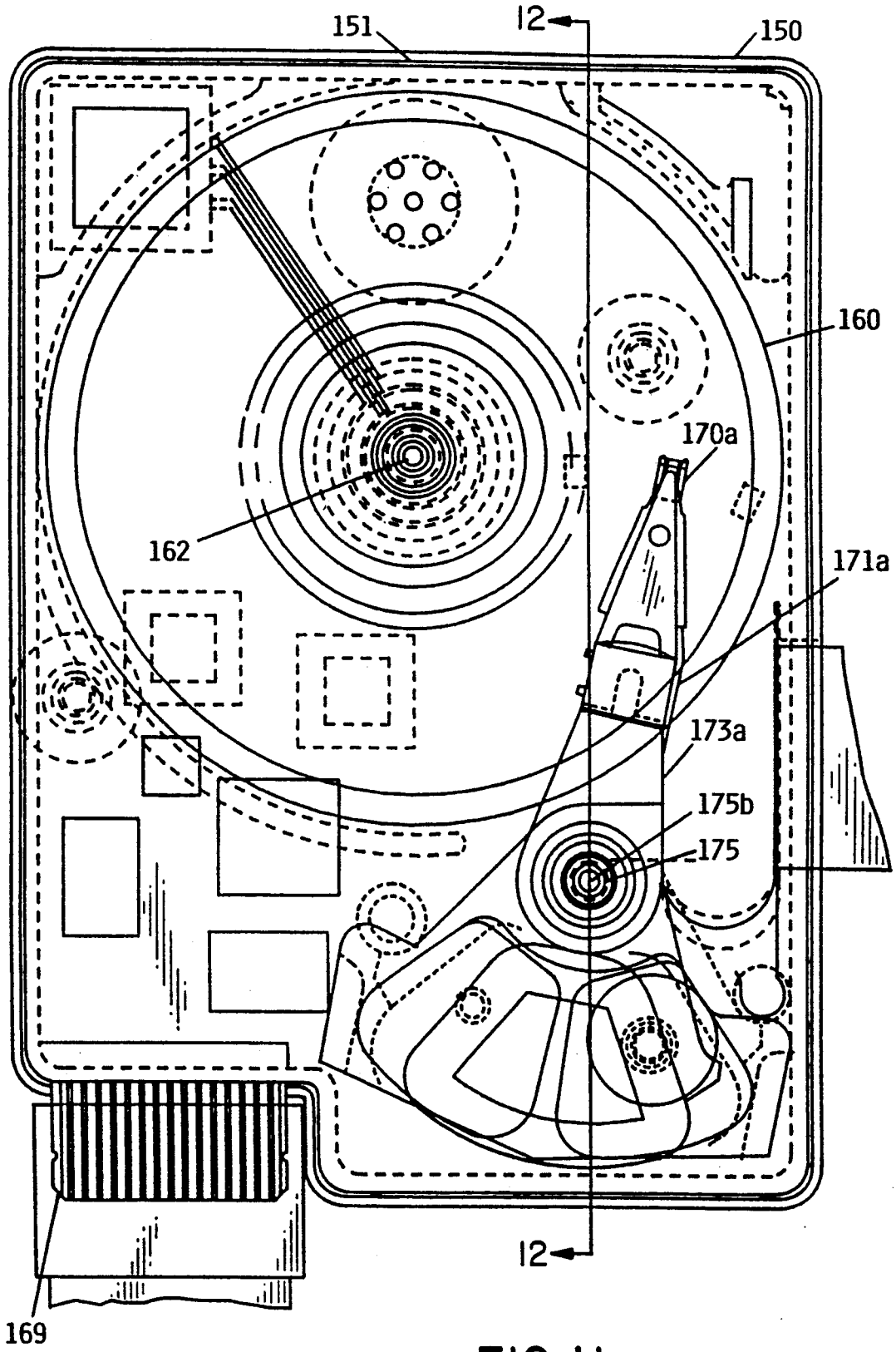
FIG. 11 is a plan view of the disk drive used in the storage subsystem of the invention.

FIGS. **12*a* and 12*b* are sectional side view along the line XII—XII of the disk drive shown in FIG. 11**.

FIG. **13*a*** is an exploded view of the actuator and head arm assembly.

Figure 13A:
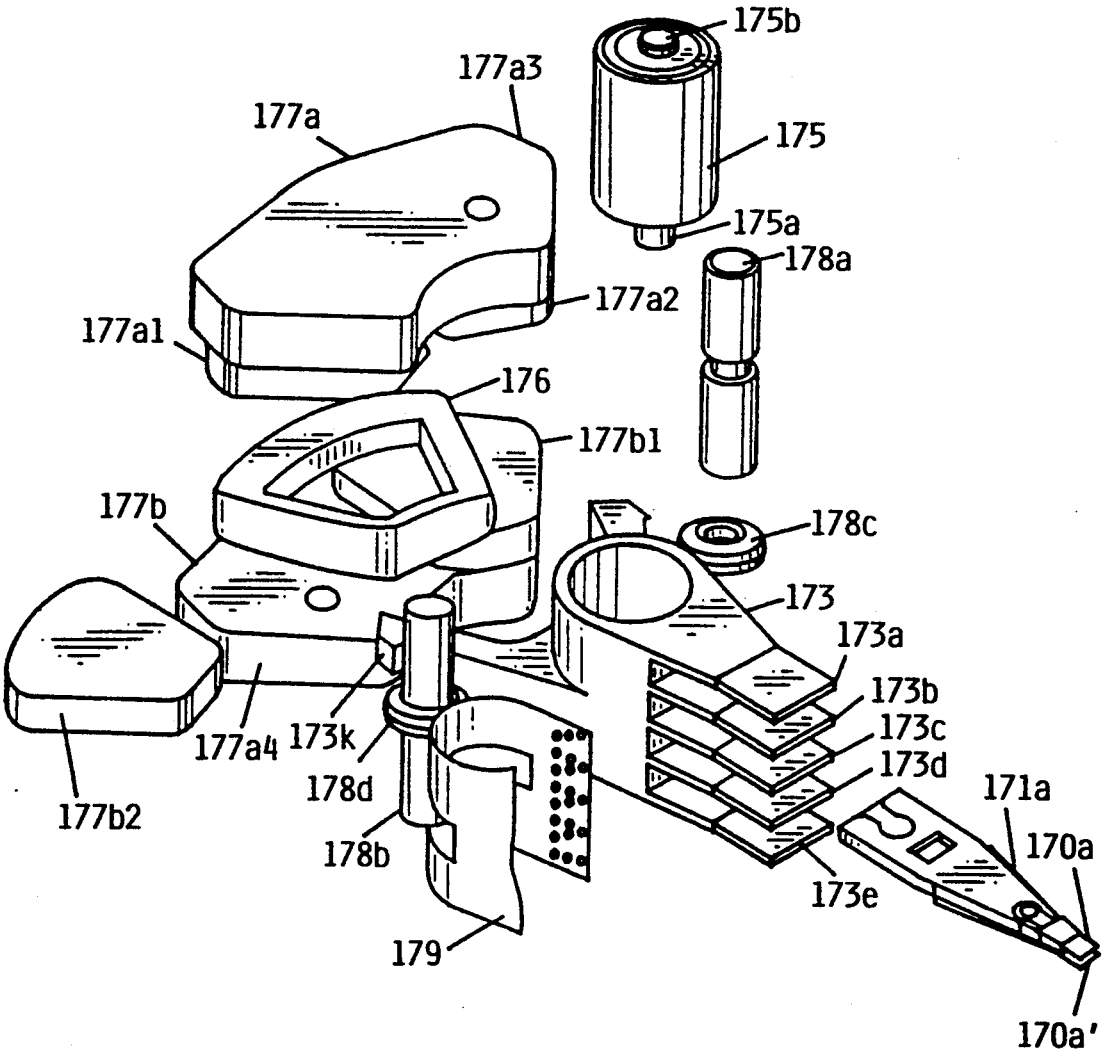
Figure 13B:
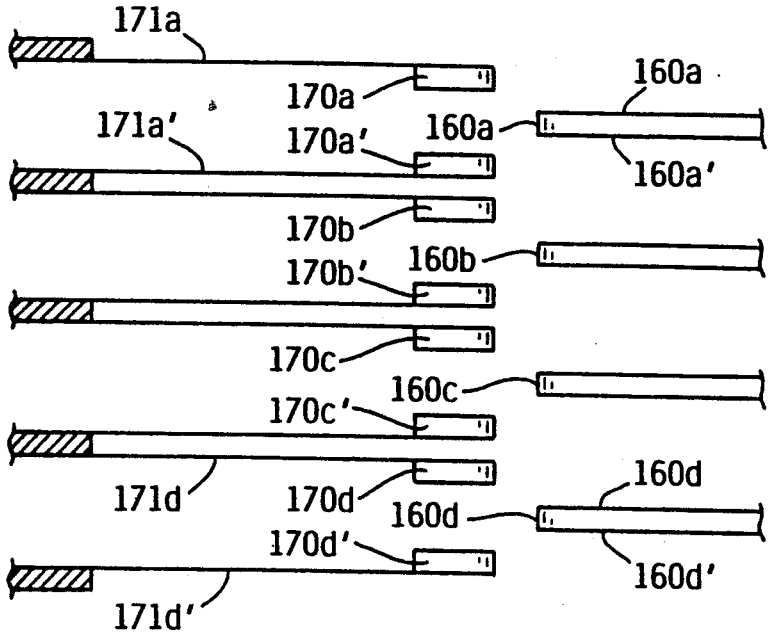

FIG. 13*b* is a partial side sectional view of the ends of the head arm assembly and the disks.

Figure 14:
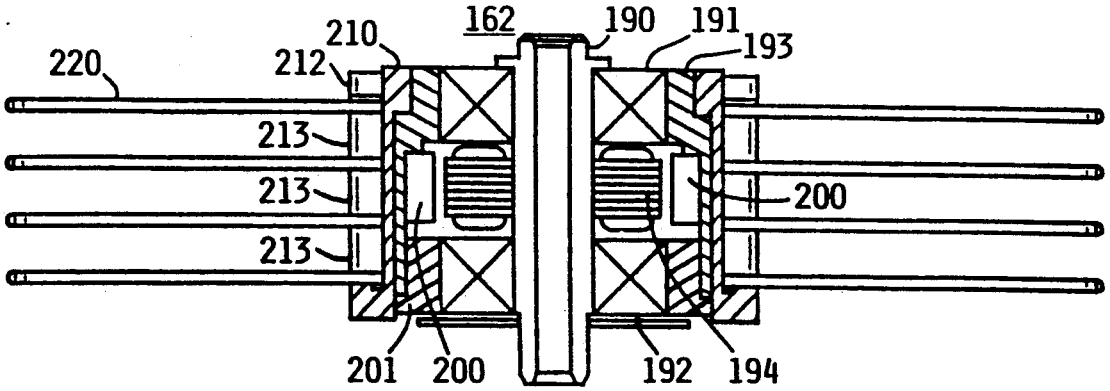

FIG. 14 is a side sectional view of the spindle drive motor drive taken through the center of the bearing support.

Figure 15:
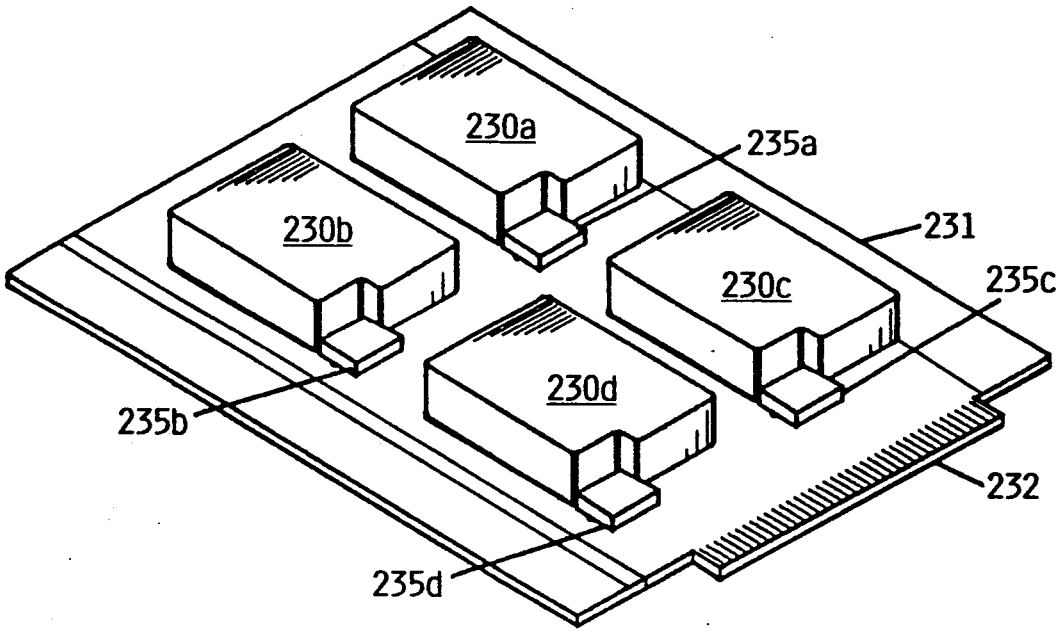

FIG. 15 illustrates the arrangement of four disk drives mounted on a card which fits the standard form factor of a 5¼" disk drive and allows the individual units to be disconnected and connected.

Figure 16:
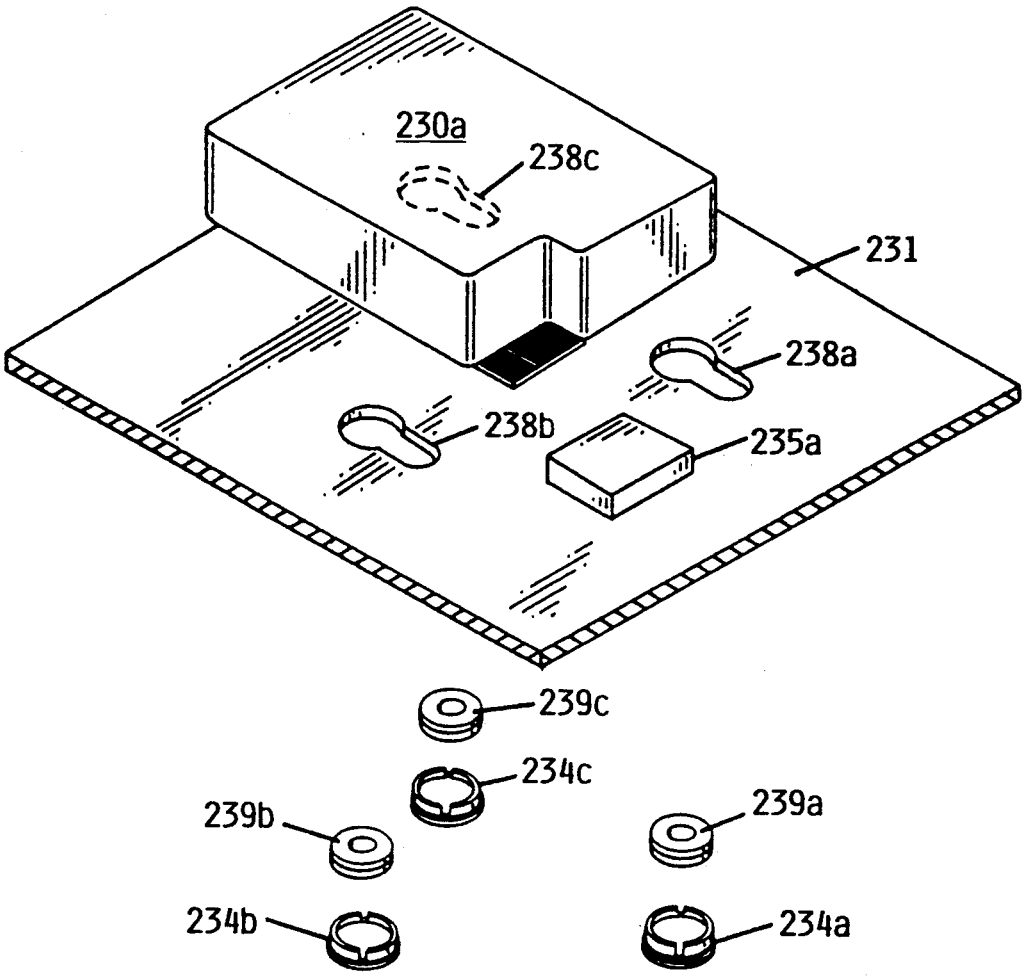

FIG. 16 illustrates the fashion in which the individual DASDs are mounted on the card.

Figure 17:
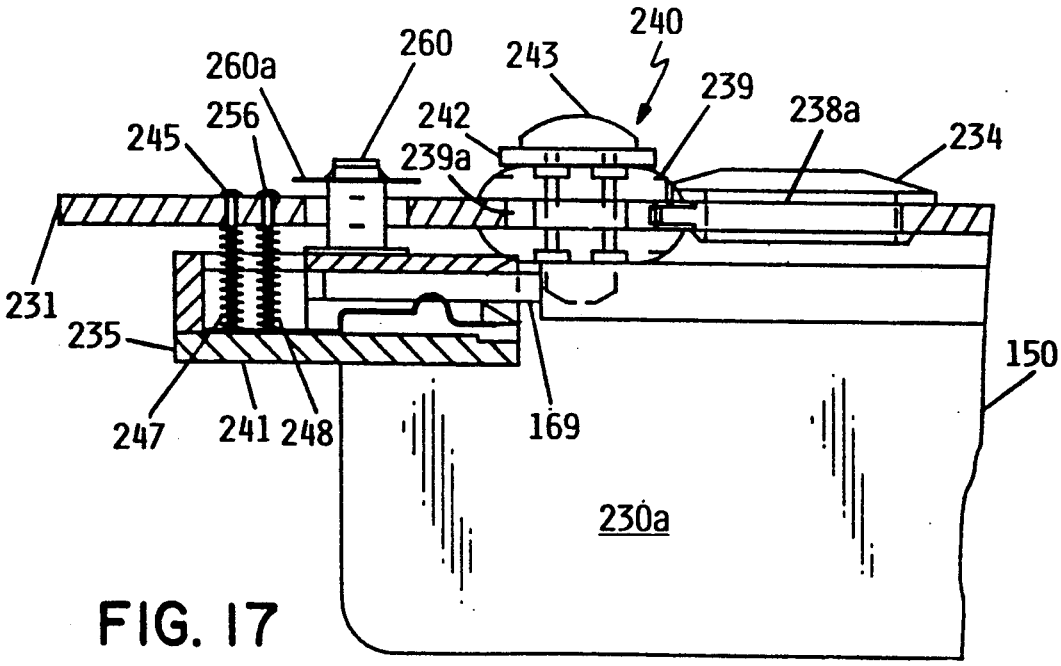

FIG. 17 is a detailed cross sectional view of the shock mounting and socket for the DASDs.

Figure 18:
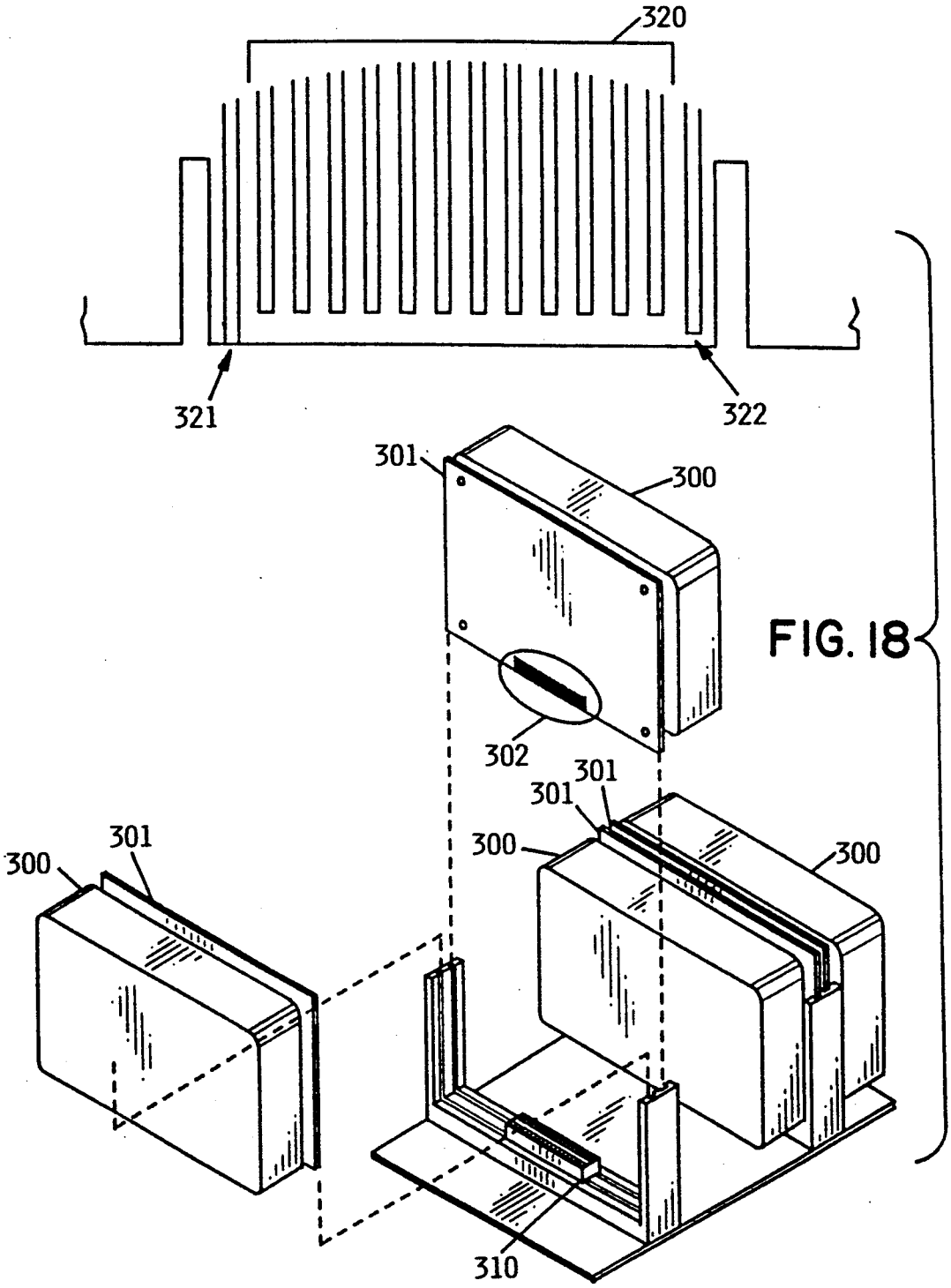

FIG. 18 is a drawing showing the arrangement of plug and guides which allow individual clusters to be unplugged from the array and replaced.

DESCRIPTION OF THE INVENTION

Figure 1:
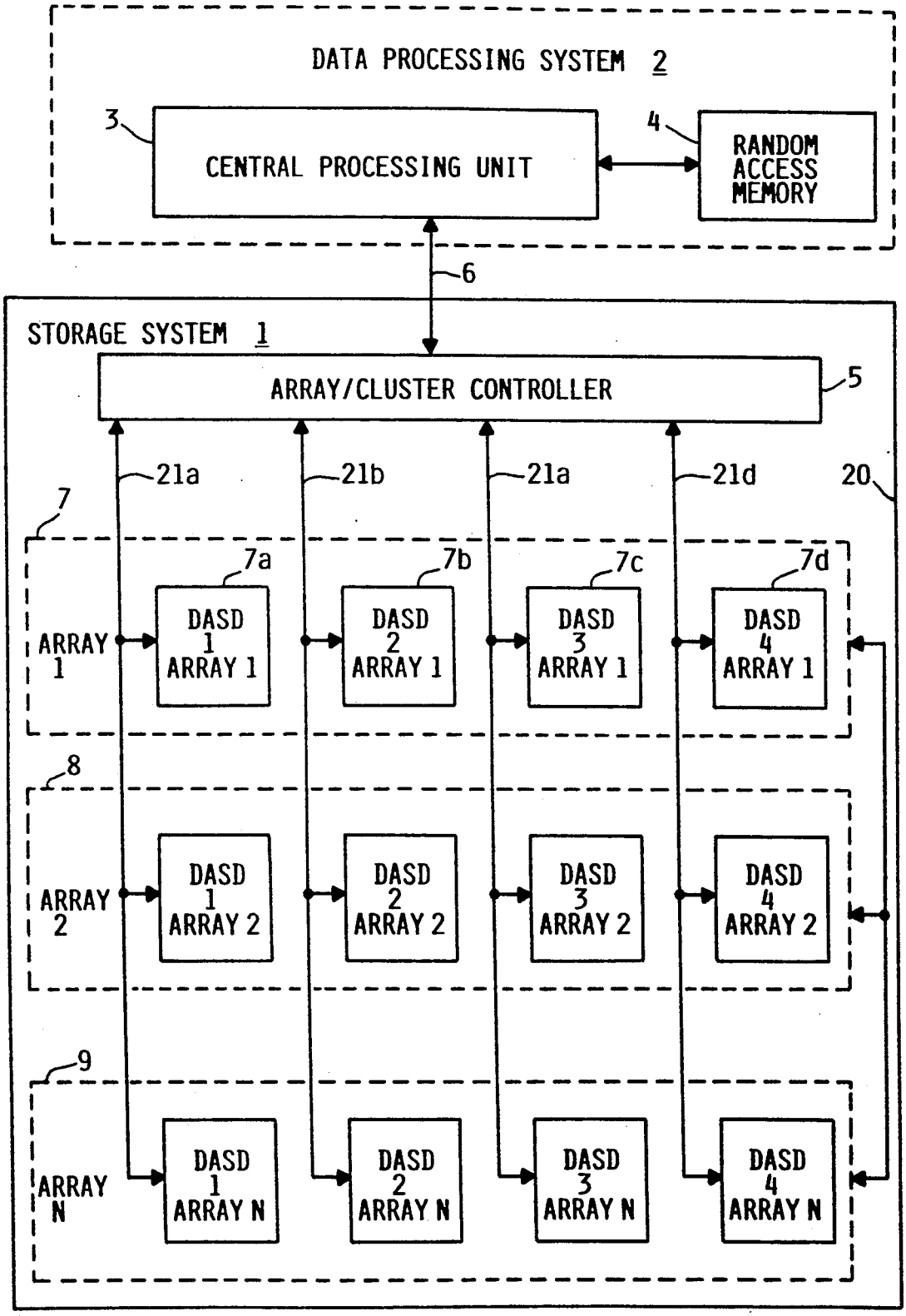
FIG. 1 is a functional block diagram showing the architecture of the disk storage system of this invention.

In addition to the novel hardware which goes into this invention, there is a functional configuration which differs markedly from the prior art. With reference to FIG. 1, the functional configuration of the disk storage system 1 includes an array/cluster controller 5 and a plurality of storage arrays 7, 8 and 9. Each of said arrays. preferably includes four separate disk files, for example, 7*a*, 7*b*, 7*c* and 7*d*. The actual number of separate disk files in each array may be greater than four, but four is the preferred number for the reason of geometric compatibility with the existing personal computer form factor for a half-high 5¼ disk drive as previously mentioned. For the configuration of this invention, an array is a direct access storage device (DASD) subsystem design that distributes data among the components of the system in a fashion which, contrary to expectations which normally would be expected from a more complex design having additional mechanical parts, makes the storage and retrieval of data both faster and more reliable.

Data is conveyed between disk storage subsystem 1 and data processing system 2 under the supervision of the array/cluster controller 5 which is connected to central processing unit 3 by the data bus 6. Controller 5 operates to convert the format of data stored in random access memory 4 of data processing system 2 into the format used in storing the storage data in the arrays. Controller 5 functions to segment a parcel of data into three units plus a parity unit, and to transfer the resulting four units over the data lines 21*a*, 21*b*, 21*c* and 21*d* for storage on DASD's 1, 2, 3, and 4 of the array selected by the signal on control line 20.

Figure 2:
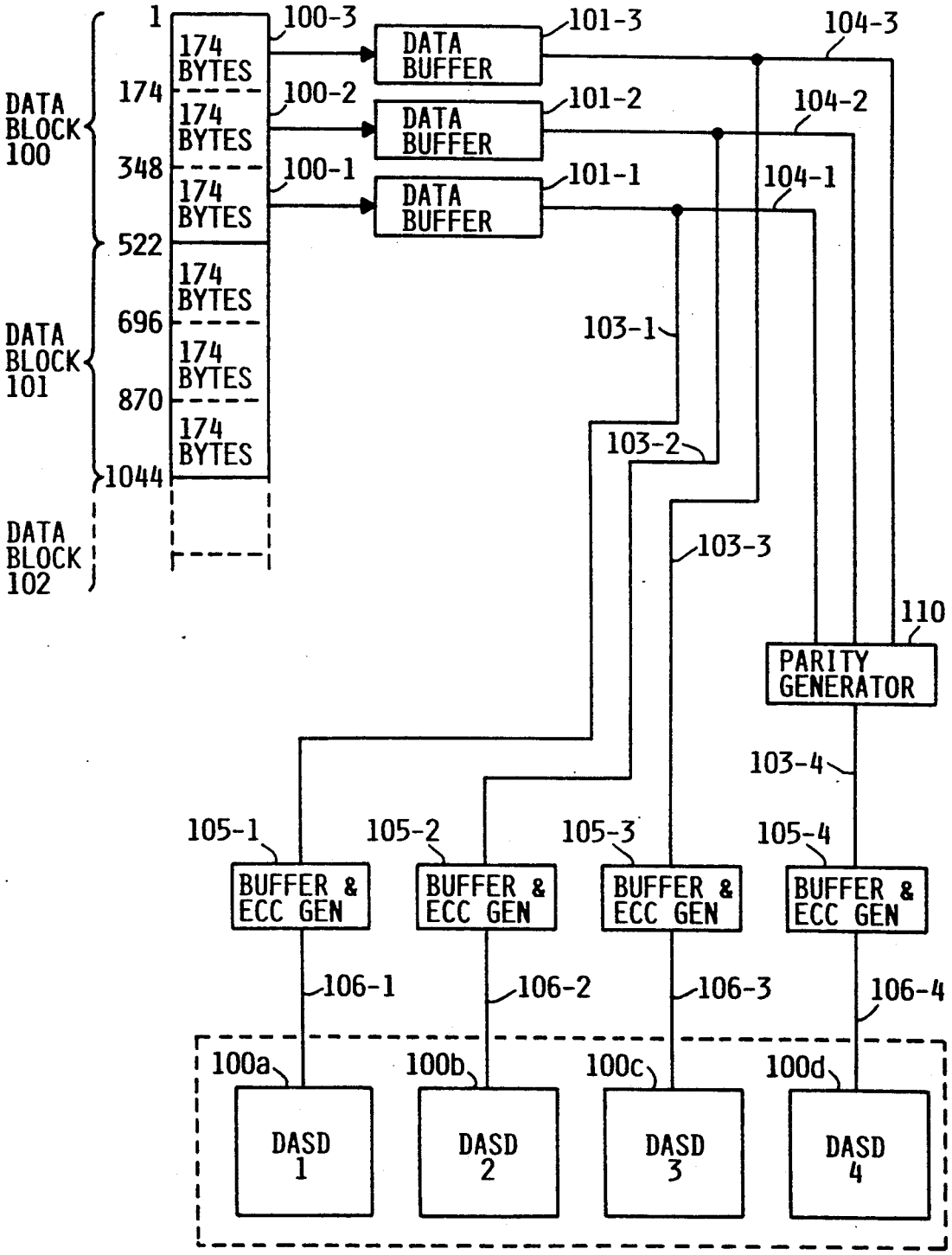
FIG. 2 is a functional block diagram illustrating the conversion and transfer of data from the data processing system to the storage subsystem.

FIG. 2 shows the fashion in which the data format is converted from that used in data processing system 2 to the format of the disk storage system of this invention. The data stored in random access memory 4 of data processing system 2 is customarily arranged in parcels compressing data blocks 100, 101 through 10*n* of 522 bytes of data each. The array/cluster controller 5 operates as shown in FIG. 2 to divide each block of data into three partitions 100-1, 100-2 and 100-3 of 174 bytes each. The first byte of each of the partitions 100-1, 100-2 and 100-3 is placed in the corresponding one of buffers 101-1, 101-2 and 101-3, from which the corresponding units of data are simultaneously fed serially over lines 103-1, 103-2 and 103-3 to the corresponding buffer and error correction code generators 105-1, 105-2 and 105-3. The three data units from data buffers 101-1 , 101-2 and 101-3 are fed over lines 104-1, 104-2 and 104-3 to parity generator block 110 to develop the appropriate parity unit on line 103-4 to the buffer and error correction code generator 105-4.

The resulting four data units on lines 106-1, 106-2, 106-3 and 106-4 represent data block partitions originally read from a single data block and converted into three partitions plus a partition representing a parity partition. These four data units are recorded in interleaved fashion between the four DASD devices 100*a*, 100*b*, 100*c*, and 100*d* at identical logical addresses 100*c* and 100*d*. Each unit (partition) is recorded on a different disk drive, but they are recorded in parallel (simultaneously). When the transfer and conversion of data block 100 has been completed, the first units 100-1 of the data block are recorded on DASD 100*a*, the second units 100-2 of the data block are recorded on DASD 100*b*, the third units 100-3 of the data block are recorded on DASD 100*c* and the parity units for data block 100 are recorded on DASD 100*d*.

The data to be recorded will customarily be transferred to the controller 5 in 522 byte blocks. Conversion of the 522 byte data block into three 174 byte data partitions is preferably done by reading each partition of the data block into a logical FIFO buffer, which could be the buffers 101-1, 101-2 and 101-3.

Figure 3:
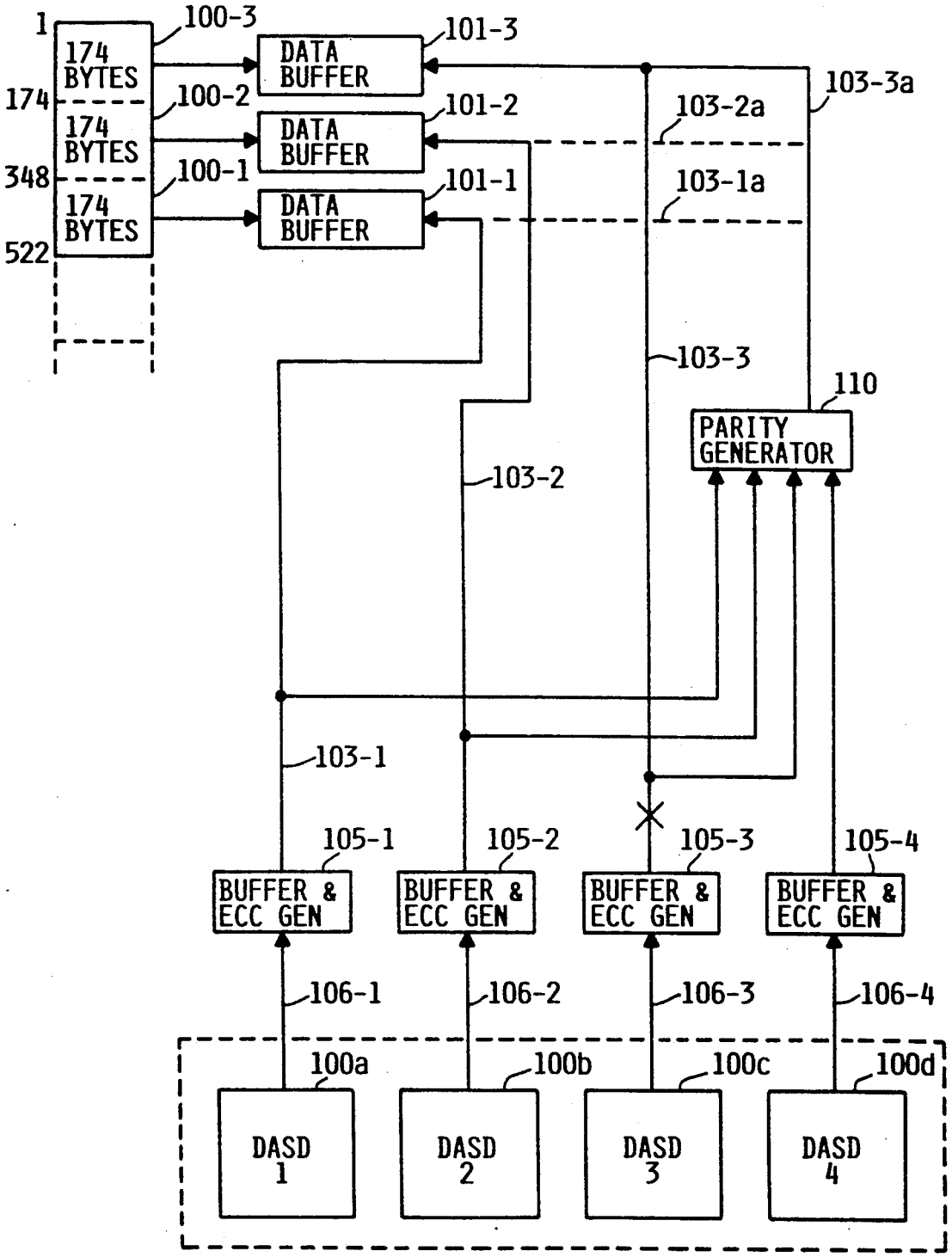
FIG. 3 is a functional block diagram illustrating the transfer of data from the storage subsystem to the data processing system under conditions of a disabled disk drive.

The technique for the regeneration of data lost on a defective or inoperative DASD is illustrated in FIG. 3. It will be assumed, for the purpose of illustration, that the DASD 100*c* containing the data partition 100-3 has failed in some manner the data it contains unavailable. This is illustrated in FIG. 3 by the X over line 103-3 leading from buffer and ECC generator 105-3 to data buffer 101-3. The means for detecting a DASD failure will be discussed later. When the DASD read failure has been detected, the system is reconfigured to take the arrangement of FIG. 3. The arrangement of FIG. 3 is essentially the same as that of FIG. 2 except that the direction of data flow is reversed. As each data unit is made available from DASD 100*a*, 100*b* and 100*d*, it is converted into the original data format by the buffer and ECC generators 105-1, 105-2 and 105-4. The unit from DASD 100*c* is not available. The signals on lines 103-1, 103-2 and 103-4 are fed to the parity generator 110 where the missing data unit is reconstructed and supplied to data buffer 103-3 over line 103-3*a*, which represents a connection made by the system after it recognizes that DASD 100*c* has failed. The dotted lines 103-2*a* and 103-1*a* represent the connection Which is made in the event of failure of DASDs 100*b* or 100*a*, respectively.

While the preferred embodiment utilizes a combination of software and hardware dedicated to the task of developing the data partitions, parity units and error correction code, the same functions could also be performed by a microprocessor operating under the control of a suitable program or alternatively by totally dedicated hardware. In most cases, the optimum configuration will include dedicated hardware, as well as software. The particular embodiment will depend on such factors as the speed of the data transfer relative to the speed of the microprocessor, the relative cost of alternative approaches and other typical design tradeoffs.

It will be appreciated that the preferred embodiment of the invention contemplates the conversion of 522 byte blocks into three 174 byte data partitions which are then recorded, with a parity partition, in parallel fashion on four separate disk drives. While this is believed to be the optimum arrangement, other configurations may also be used. For example, instead of converting 522 byte blocks into three partitions, it would be possible to convert each byte into three portions or to use blocks which are larger or smaller than 522 bytes. If these or other modifications are made it would also be appropriate to make modifications to the buffers as well. Departures from the optimum size may result in degraded performance as a result of less than optimum transfer of data between the buffers and the disk drives. Other configurations include the use of more than four disk drives or even fewer drives. However, any departure from the optimum number of four drives may lose the advantage of physical compatibility with the industry standard for half-high disk drives and result in lower reliability than the optimum four drive configuration.

Returning to FIG. I, the array/cluster controller 5 performs the additional function of maintaining status information for each individual DASD in the system. This function is preferably performed in conventional fashion by a microprocessor operating under program control. The status information is maintained in three data sets denoted the "DASD List", the "Degraded DASD List", and the "Rebuild DASD List". The DASD list contains all the vital product data on every DASD in the system and is organized by the DASD's locations in the cluster, i.e., M rows by N columns. The vital product data is information which is originally contained in the DASD and which is retrieved from it by the array/cluster controller 5. Such information would normally include the manufacturing serial number of the DASD, the number of the engineering changes and/or the engineering change level. This information is read by controller 5 at the time of power up and other critical times by polling all the DASDs in the system. This procedure ensures that the vital product data for a drive which failed and has been replaced will be revised to reflect the new DASD. The detection of a new drive can be accomplished simply by comparing the vital product data read from each drive with the vital product data which previously existed in the system (developed by the last pooling of the DASDs). In the event that a DASD does not reply to the poll issued by the array/cluster controller 5, the DASD is flagged as broken or inoperative. A drive that is detected to have been changed is flagged to have the data allocated to it to be rebuilt. The procedure for rebuilding the data formerly contained on a failing DASD has been mentioned previously and will be described in more detail at a later point.

The Degraded DASD List is used where a DASD has failed, but it is not desired to immediately replace the failed unit. As previously described, a failed DASD does not render the system completely inoperative. That is, the data contained on a failed DASD can be regenerated as described with reference to FIG. 3. The regeneration of data contained on the failed DASD may occur either for the purpose of rewriting the data on a new DASD which replaced the defective unit, or, alternatively, the regenerated data may be used by the data processing system 2 just as if it had come directly from the failed DASD. In the event that a DASD does not complete a Vital Product Data read command or write command after an error recovery routine, the particular DASD in the array is flagged as degraded. The list of degraded DASDs allows the system to inhibit the normal error recovery routines when issuing read and write commands to the degraded units. In such situations, the data recovery technique of FIG. 3 allows the system to continue functioning without the imposition of the burden of executing the error recovery function for all the transferred data. There is, of course, a price which must be paid for this capability, which is that the failure of an additional DASD in the same array results in a situation where operation of the system cannot continue. It is desirable that operation of the system with a failed DASD be continued only for a limited period of time, and the failed DASD be replaced as soon as convenient.

When the array/cluster controller 5 recognizes from the vital product data that the failed DASD has been replaced with an operative unit, the array/cluster controller 5 removes the failed DASD from the Degraded DASD List and places the new DASD on the Rebuild DASD List. This list is a record of the individual DASDs that require the data assigned to the previously failed location in the array to be regenerated. In addition to the identity of the failed DASD, the Rebuild DASD List also includes the number of sectors in the DASD in which data has been restored. The use of a list which includes sector information allows the system to regenerate the data in a background mode, thereby allowing the execution of normal commands by the central processing unit 3 and minimizing the impact on operation of the data processing system 2.

Figure 4:
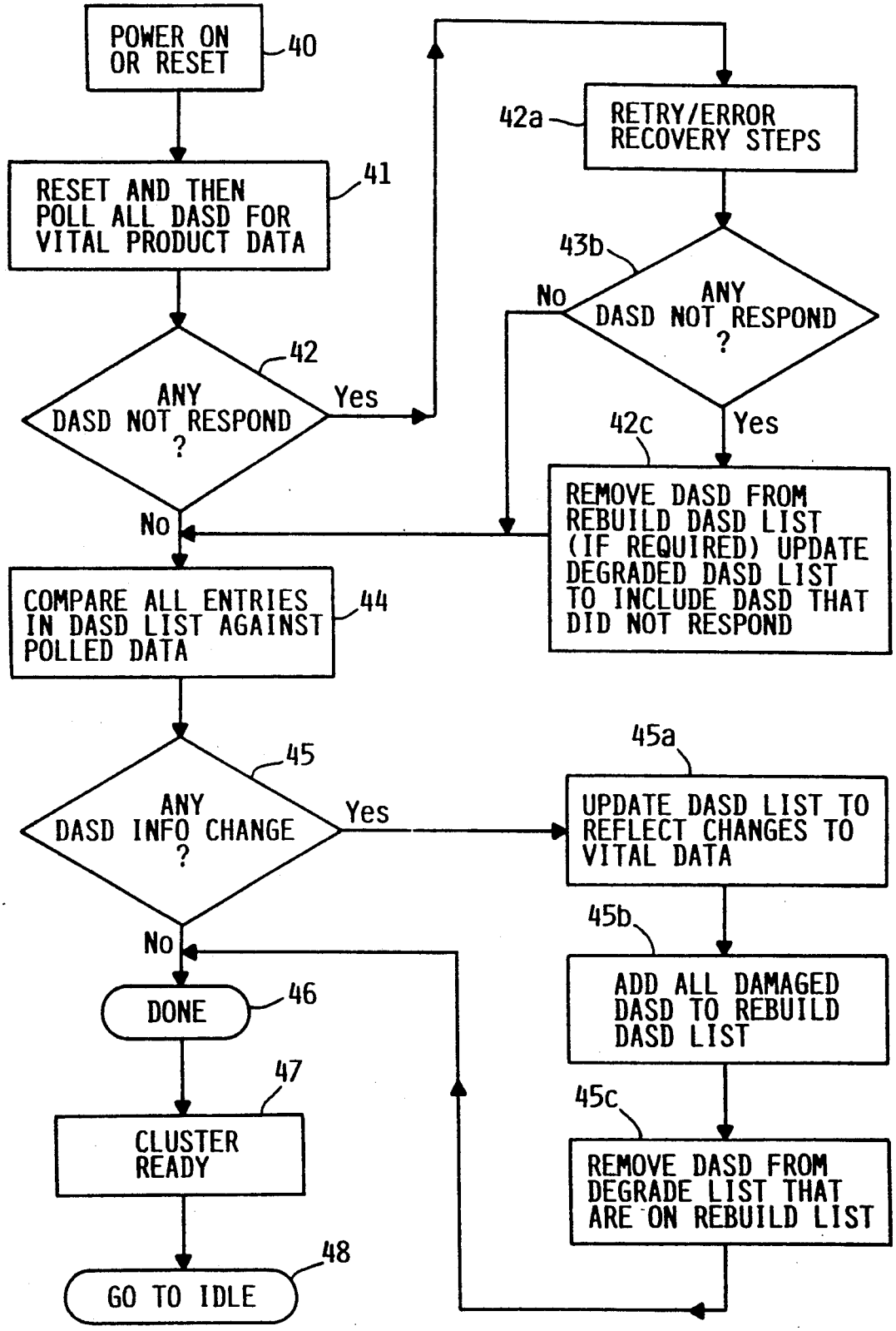
FIG. 4 is a data flow chart illustrating the program utilized by the array/cluster controller during system power up and system resets.

In the portion of the array/cluster control program represented by the data flow chart of FIG. 4, the subroutine is initiated at block 40 with the detection of a signal representing that the system has been powered on or, alternatively, a signal representing that the system has been reset. These signals are customarily generated in data processing systems and used for a variety of purposes.

Block 41 resets all the DASDs in the cluster and polls the individual DASDs in each of the arrays in the cluster. The polling reads vital product information from each operative DASD in the cluster. Each DASD supplies its unique serial number and information indicating any engineering changes and/or engineering change level. In addition, information on the individual sectors of the DASD is also provided.

When the polling of all location in each array of the cluster has been completed, the test at block 42 is performed to determine if any DASD location in the cluster has not responded to the poll. The failure of a DASD location to respond to the poll is interpreted as an error condition and the program branches to a retry/error recovery procedure at block 42*a*. This procedure will attempt to read the vital product data from the DASDs which did not respond properly during the poll represented by block 41. If the retry/error recovery steps of block 42*a* result in successful reading of the vital product data from DASDs which previously failed, the NO decision in block 43*b* returns operation to the main line sequence of instructions. On the other hand, if there is still a DASD which fails to properly respond, the YES decision at block 43*b* causes the program to branch to block 42*c*. The operations at block 42*c* include removal of the DASD which failed to respond from the Rebuild DASD List if it has not already been removed. In addition, the failing DASD is added to the Degraded DASD List, after which the return to the main line program is made.

When all available information has been read from the operative DASDs and those which failed have been added to the Degraded DASD List, the program operates to compare the current vital product data with the data obtained from the last reading as shown in block 44. The vital product data from the DASDs is arranged according to the DASD position in the array. In the preferred embodiment there are four DASDs in each array, and N arrays in the storage subsystem. If any information has changed since the last reading, the program branches from the YES decision to block 45*a*, which then updates the DASD List to reflect the changes in the vital product data. The program next performs the operations of block 45*b*, which adds the damaged DASDs to the Rebuild DASD List. The step at block 45*c* further updates the stored DASD information by removing all DASDs which are on the Rebuild List from the Degraded List.

At this point, the subroutine is complete, as indicated by block 46, and the program develops a "cluster ready" signal at block 47 to indicate that the subroutine has been completed and the CPU may transfer data to, and request data from, the storage subsystem. The subroutine then enters an idle state, represented by block 48, until the next power on or system rest signal is detected.

Figure 5:
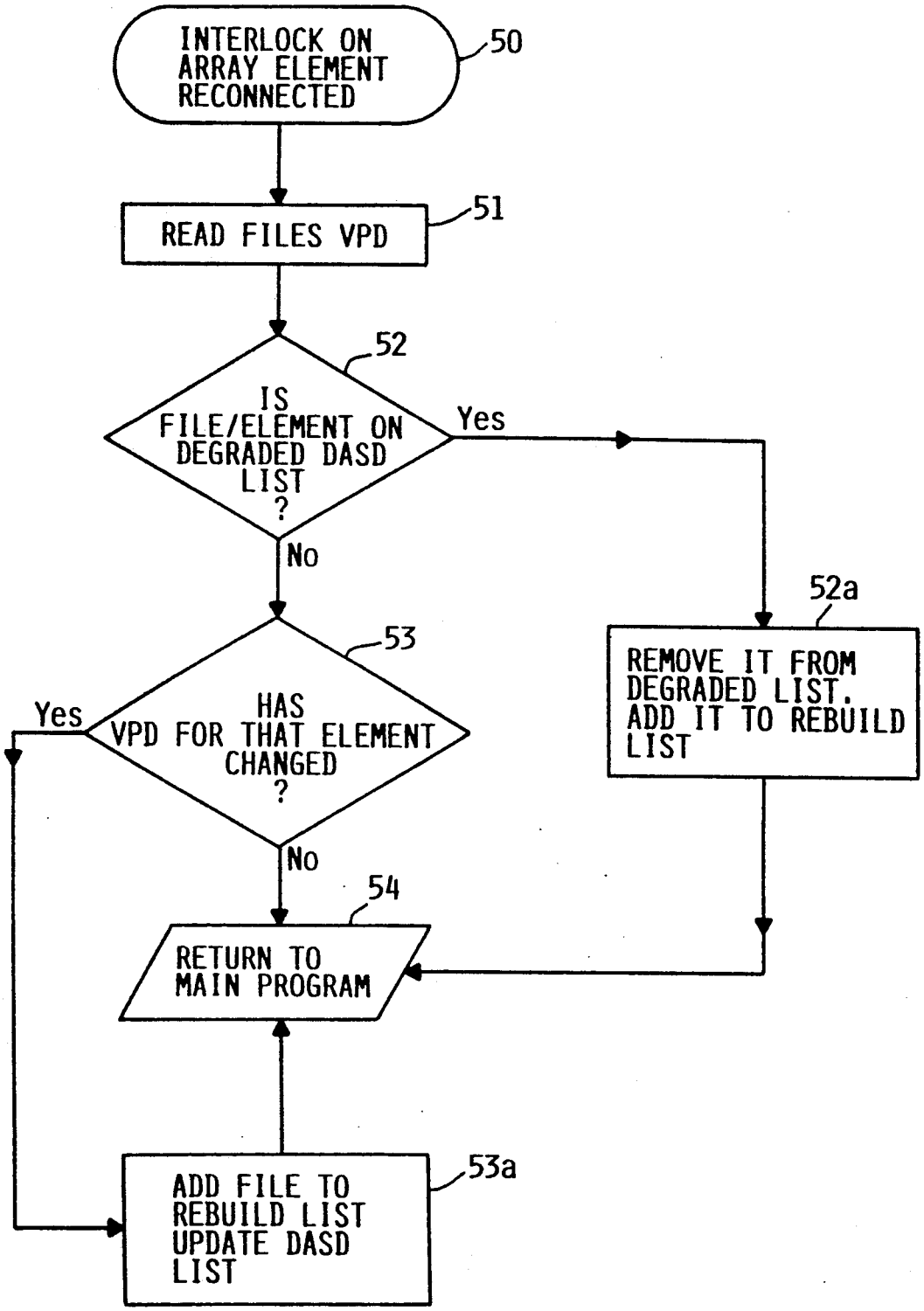
FIG. 5 is a data flow chart illustrating the portion of the control program which accommodates the removal of a defective DASD and substitution of a good DASD without removing power from the system.

With reference to FIG. 5, the technique for accommodating the replacement of a defective DASD without removing power from the system is shown. While it would be simpler to power down the system for the purpose of replacing a defective DASD, there are many occasions where this is undesirable. For example, the system may be capable of limited operation even with the defective DASD, and powering down would entail completely discontinuing the limited operation. This may be very undesirable in applications where the system is involved in real time operations, for example, controlling terminals or a data acquisition system. In such environments, it is often possible to continue operations for a limited time even without normal DASD performance and the alternative, shutting down the system, has very serious consequences. There is, therefore, a compelling need for techniques which allows the repair or replacement of failed components of the system without shutting down, even if it means operating with degraded performance for a limited period of time.

When a DASD fails, the usual course of action will be to replace the defective unit as soon as possible. Since with this invention the replacement is very simple to perform, both from the mechanical and the programming standpoint, the operation can be performed by the operator, without the assistance of a person skilled in computer maintenance. Accordingly, there is no delay while a service call is requested and a maintenance person travels to the computer site. Not only does this save time in restoring the system to full capability, it also saves the cost of a service call. While it might be possible for the operator to power down the system and perform the physical replacement of a defective drive, it is also necessary to bring the new drive on line. This has required programming skills not readily available at the skill level of the usual personal computer user.

The problem is therefore threefold, the replacement of a defective DASD must be physically simple, it must not require any programming skills to restore the system to operation after the DASD has been replaced, and it must allow the system to continue operation with the defective drive albeit with degraded performance.

The replacement of a DASD without removing power from the system is termed "hot plugging". Each of the assemblies into which a DASD may be plugged includes an interlock wire as part of the plug. When the DASD is unplugged from the system, the circuit to which the wire is connected is broken. If the system attempts to read data from the removed DASD, the parity circuits will reconstruct the missing data as previously described. If the system attempts to write data to the missing DASD, the system will flag the missing DASD as degraded.

With reference to FIG. 5, when the operator opens a system and removes the defective DASD, the interlock circuit is opened. When the operative DASD is plugged in, the interlock circuit is closed and an interrupt signal is generated to the controller 5. The interrupt detection occurs in block 50 of the data flow chart. The program then proceeds to block 51 which reads the vital product data for the particular DASD cluster/array position. In block 52, the program investigates the vital product data for that position which generated the interrupt and determines whether it was on the Degraded DASD List. If the DASD position was on the degraded list, the program follows the YES branch to block 52*a* which then operates to remove the DASD from the Degraded DASD List, add it to the Rebuild DASD List, and return to the main line program as shown in block 54.

In the event that the test performed in block 52 produces a NO result, indicating that the DASD position was not the Degraded DASD List, the branch is made to block 53. At block 53, the program reads the vital product data from the newly plugged DASD and compares the data read to the vital product data which previously existed for the DASD position. If the vital product data has changed, indicating that a new DASD has been plugged into the position, the YES branch proceeds to block 53*a* which adds the DASD to the Rebuild DASD List, adds the information to the DASD List, and returns to the main program at block 54. Alternatively, if the test at block 53 results in a NO decision, indicating that the vital product data has not changed, the program simply returns to the main program at block 54.

Figure 6:
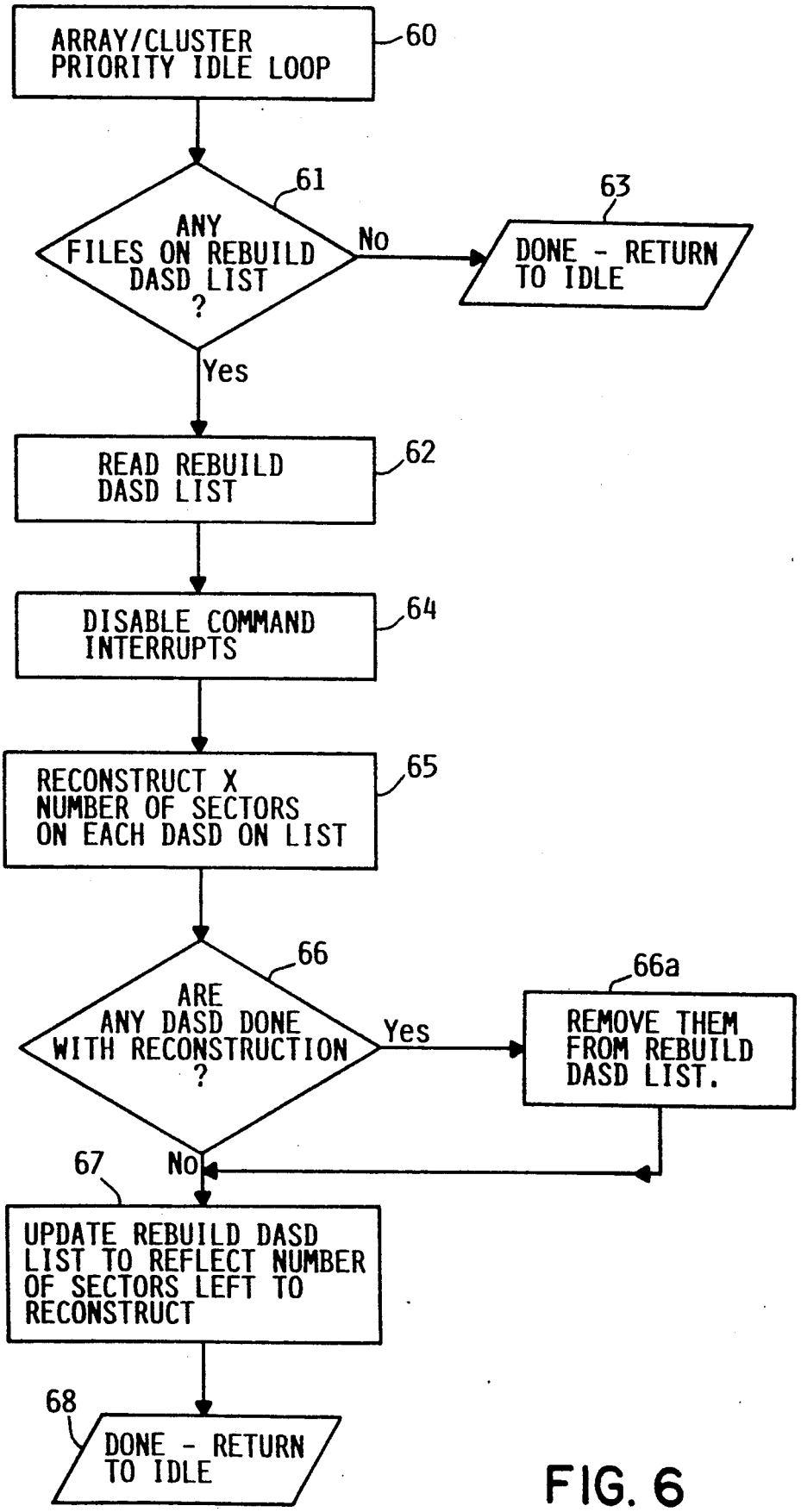
FIG. 6 is a data flow chart illustrating the portion of the array/cluster program which is effective to rebuild, that is to reconstruct, data on a new DASD which has replaced a DASD determined to be defective.

The rebuilding of the original data on a new DASD is accomplished by the program represented by the data flow chart of FIG. 6. Entry to this program is from the idle loop in the array/cluster controller 5 program as represented by block 60. At block 61, the program interrogates the Rebuild DASD List to see if there are any DASDs which must have the data restored. This test can be made periodically or only during the time the array/cluster controller 5 is in the idle state. If the test at block 61 indicates that there is a DASD which requires rebuilding, a branch is made from the YES output. This transfers the program to block 62 which is effective to read the Rebuild DASD List. Of course, if the test in block 61 results in the NO output, the program simply returns to the idle state, as shown in block 63.

At block 64, the program disables the command interrupt. This prevents the reconstruction of the block of sectors from being impacted by a read/write operation. This is the simplest method for reconstruction. Other approaches are possible, for example, loading only the sectors being reconstructed while allowing normal access to the remainder of the array. The interrupts are reenabled after the reconstruction program is exited.

Next, at block 65, the program reconstructs a block of a predetermined number of sectors for each DASD on the Rebuild DASD List.

By performing the reconstruction of data on a round robin basis, x number of sectors at a time, the bookkeeping required for the operation is greatly simplified. Further, the reconstruction is ideally performed so as to have minimum impact on overall operation of the system. If an entire DASD is reconstructed before allowing the mainline control program to reassure control, the amount of time required might adversely affect performance of the system. By incorporating a limit on the number of sectors which can be reconstructed with a single entry into the Rebuild DASD program, the amount of time for which the system is dedicated to this task is likewise limited.

The test in block 66 is to determine if the reconstruction for any DASD has been completed. This is determined by examining the number of sectors that have been reconstructed. If there is a DASD which has had all sectors reconstructed, the YES branch is taken to block 66*a* which then removes the DASD from the Rebuild DASD List and branches back to the program at block 67. Alternatively, if the test at block 66 results in a NO result, the program proceeds directly to block 67. The operation at block 67 constitutes an updating of the number of sectors to be rebuilt contained in the Rebuild DASD List. The operation at block 68 then returns the program to the idle state from which the test of block 61 can again be performed.

Figure 7:
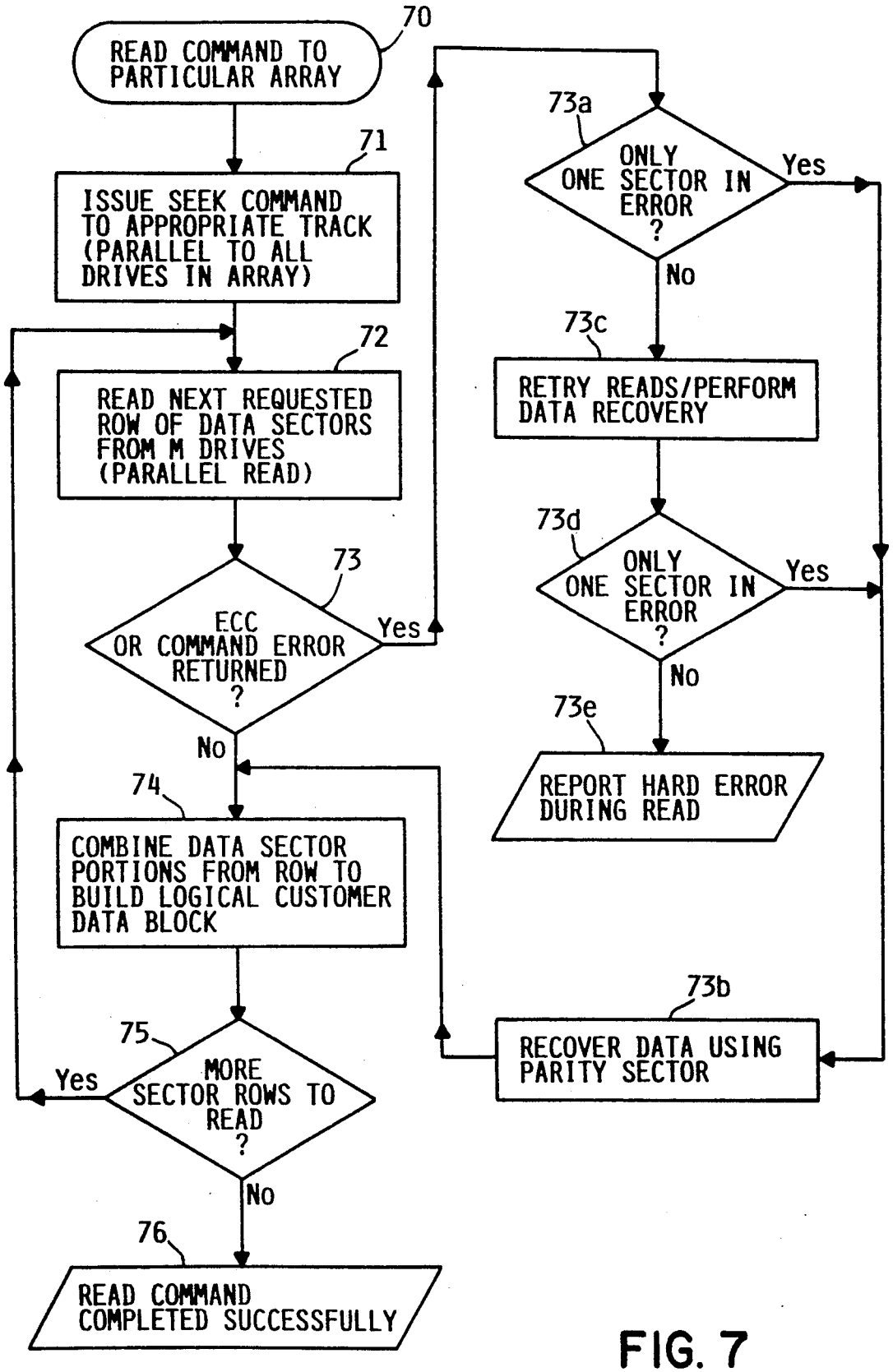
FIG. 7 is a data flow chart of the portion of the program which takes the data read from the DASDs, checks for proper parity and regenerates the original data.

The portion of the control program dedicated to the reading of data from a DASD array is illustrated in FIG. 7. Entry is made at block 70 with the issuance of a read command from the data processing system 2. At block 71, the program issues a track seek command to all DASDs in the selected array. The program operates to read the row of desired data sectors on all drives in the selected array as shown in block 72. The test at block 73 determines whether there is an error indication from examination of the error correction code or as a result of a command error.

If the test at block 73 results in the NO output, indicating no errors in the data, the program proceeds to block 74 which combines the data read from the DASDs in the array to place the data in the format as it was originally passed from the data processing system 2 for storage in the storage subsystem 1.

If however, the YES output of block 73 is conditioned, the program branches to block 73*a*, at which point the program analyzes the error signal to determine if a single sector error has occurred. If the error is limited to a single sector, the YES output is conditioned and the program branches to block 73*b*, which recovers the data lost due to the error by means of the sector parity information. The program then returns to the mainline program and combines the data retrieved from the DASD to recreate the data block which was originally stored.

In the event that the branch from block 73*a* occurs from the NO output, indicating that the error extends for more than one sector, the program branches to the block 73*c*. This causes the system to retry the read operation and, additionally, execute the data recovery operation. If this is successful in reducing the magnitude of the error to a single sector, the program follows the YES output from block 73*d* to block 73*b*. If the magnitude of the error remains more than a single sector, the exit from block 73*d* is from the NO output, resulting in the report of a hard error during read by means of block 73*e*.

In the event that the program follows a path to block 74 to recreate the original data, the program continues to block 75, which is effective to test the read command to see if another sector remains to be read. If the read operation is not yet completed, the YES output is conditioned and the program follows the path to reenter the read program at block 72. If there are no further sectors to read, the NO output is conditioned and the program branches to block 76, signalling that the read operation has been successfully completed.

Figure 8A:
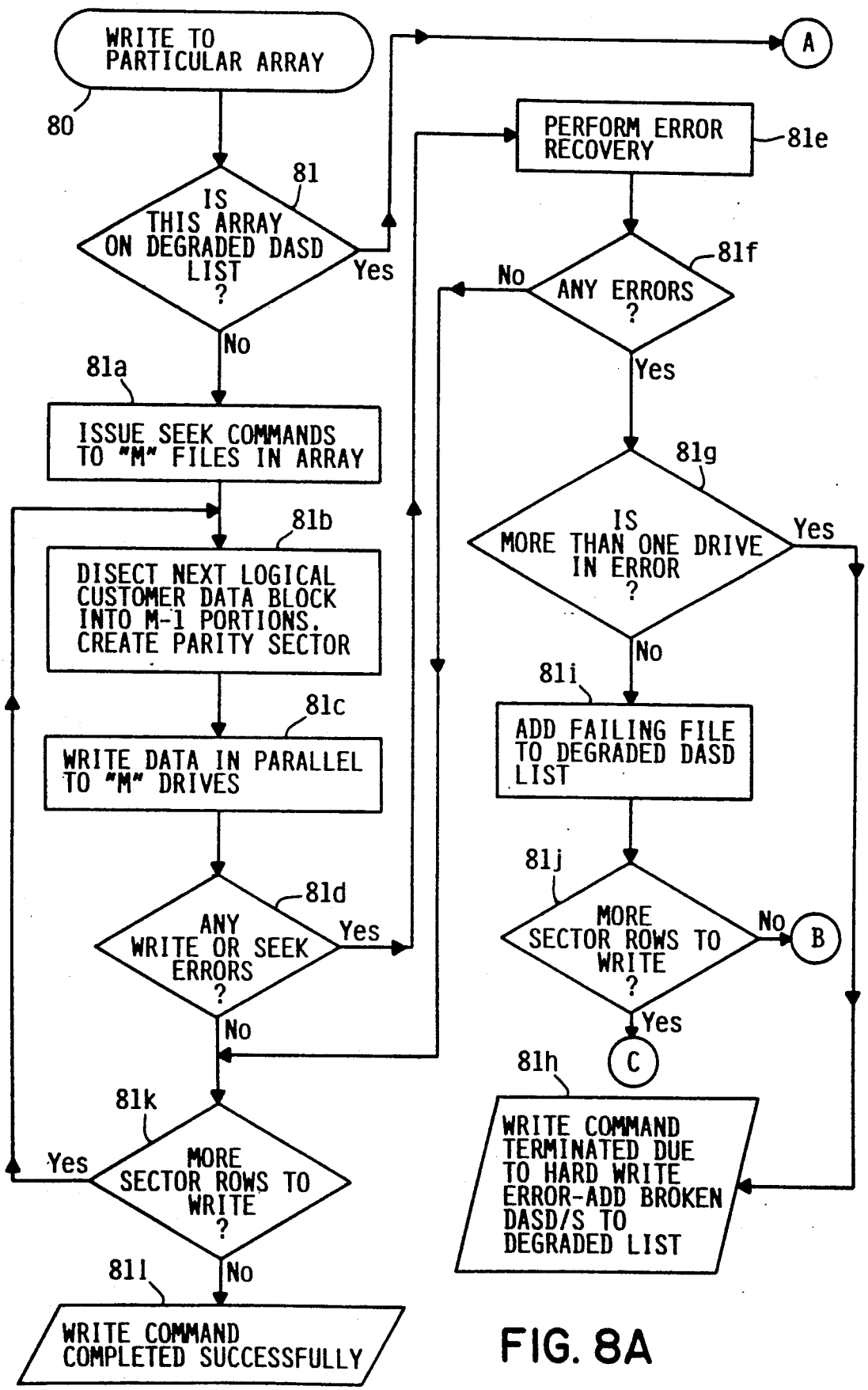
FIGS. 8A and 8B constitute a data flow chart of the portion of the program which is effective to write data from the data processing system to the DASD subsystem.
Figure 8B:
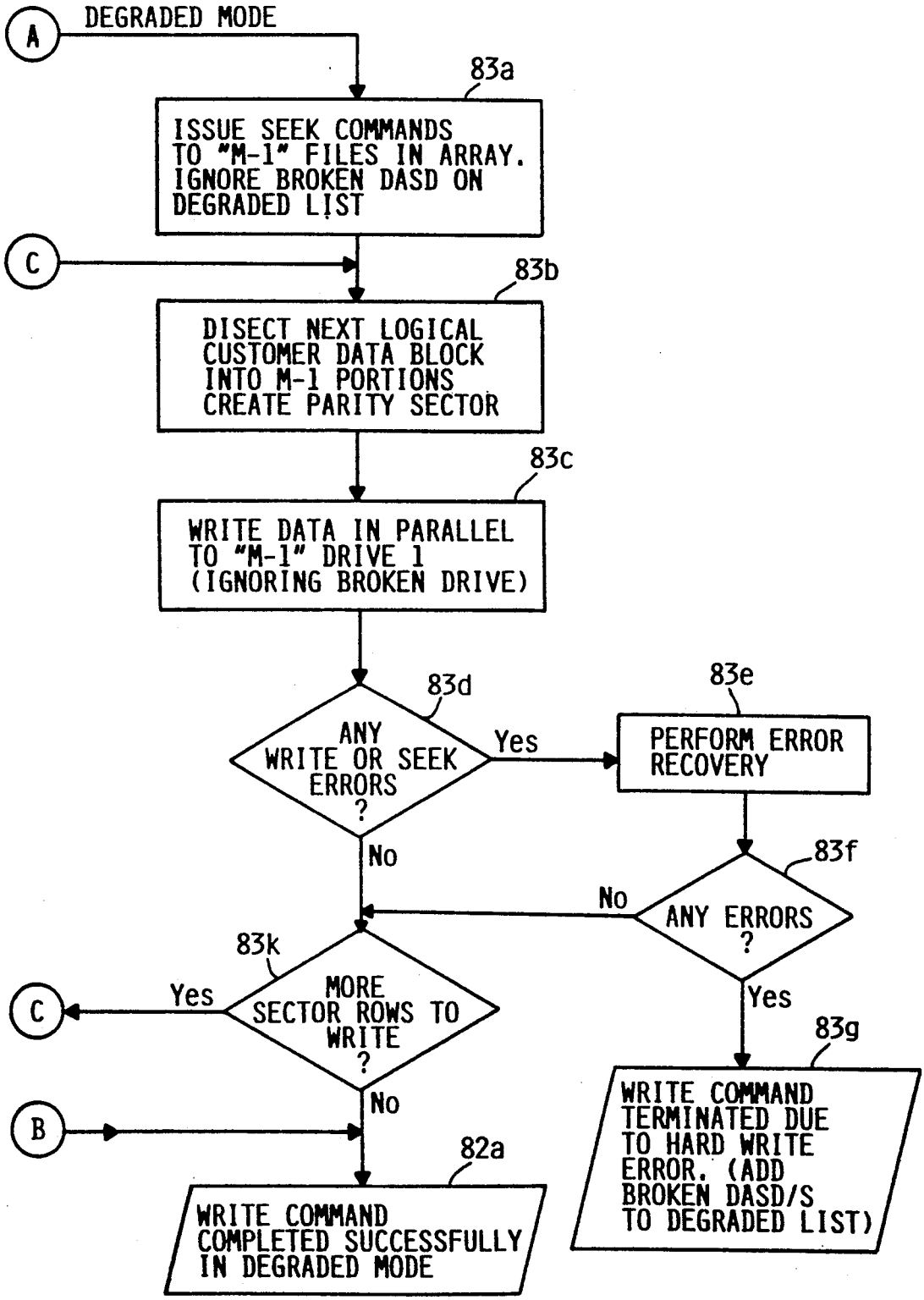

The data flow charts of FIGS. 8A and 8B illustrate the manner in which a write operation is performed by the system. The central processing unit 3 in data processing system 2 issues a write command to the array/-cluster controller 5. The write command specifies the memory address, the name of the file to be written to the storage subsystem, and the array to which the data is to be written.

When the array/cluster controller receives the write command from the data processing system at block 80, the program proceeds to compare the array specified by the write command with the list of degraded DASDs on the Degraded DASD List as shown in block 81. In the event that the array specified by the write command is not on the Degraded DASD List, the NO branch is taken to block 81*a*, which issues a track seek command to the specified DASD array. This command is received by the specified array and causes the actuator to move the read/write heads over the desired track on the disks. After issuing the seek command, the block 81*b* is effective to take a data block, such as data block 100 shown in FIG. 2, and dissect it into the appropriate number of units (partitions), three in the selected example, and generate the new parity sector (partition) for the data positions. The operation performed by block 81*b* corresponds to the data format conversion and associated buffering previously shown and described with reference to FIG. 2. This operation also included the modification of data according to the error correction code used in the system.

At this point, block 81*c* operates to write the converted data over four parallel paths to the four drives in the selected DASD array. This is the operation illustrated by the signal lines 106-1 through 106-4 in FIG. 2. Subsequent to writing the data, the block 81*d* checks the recorded data to determine if there were any write errors. This is accomplished by evaluating the status codes returned from the DASD. Track errors are detected before the write operation. In the event that an error is detected, the program follows the YES output from the branch to block 81*e*, which performs the error recovery procedures corresponding to the nature of the errors which were detected. A second test for write or seek errors is made in block 81*f*, from which the program follows the YES output to block 81*g* in the event that an error is detected. Block 81*g* performs an additional analysis of the error or errors detected in block 81*f* to determine if more than one DASD has generated an error. If the YES branch is taken, indicating that more than one DASD is in error, the YES branch leads to block 81*h*, which signals a hard write error, i.e., an error which cannot be corrected by rewriting at the same location, and adds the DASD array to which the write operation was attempted to the Degraded DASD List.

In the event that but a single DASD has been revealed to be in error by the test at block 81*g*, the branch follows the NO output to block 81*i*, which is effective to add the failed DASD to the Degraded DASD List. The program then proceeds to block 81*j*, which compares the write command and the number of sectors which have been written to see if there are any more sectors to be written. If the sectors have been written, the write command has been completed and the program follows the NO output to block 82*a*, which signals that the write command has been successfully completed and the storage subsystem is available for execution of additional commands. If all the sectors have been written, the system follows the YES output to block 83*b* of FIG. 8B.

Returning to block 81*d*, if the test for errors fails to reveal any track seek errors or write errors, the program follows the NO output to block 81*k*, which performs a comparison of the number of sectors which existed in the write command and the number of sectors written to determine if there are more sectors to write. If the YES branch is taken from block 81*k*, the program returns block 81*b*, which form as an additional data block into data units and a parity unit and writes the resulting data to the specified DASD array. In the event that all sectors have been written, the test at block 81*k* follows the NO branch to block 811, which is similar to block 82*a* of FIG. 8B operates to signal that the write command has been successfully completed and the storage subsystem is available for execution of additional commands.

Returning now to block 81, which compared the Degraded DASD List with the array specified by the write command, if the specified DASD was on the list, the program follows the YES output and branches to the block 83*a*, which performs the function equivalent to that of block 81*a*, previously described. With reference to FIB. 8B, the branch following the YES output is to the section of the program which writes data in the degraded mode. In this mode, the fact that the failing drive is on the Degraded DASD List will simply be ignored, that is, the failing DASD will be treated as if it were performing properly. This assumes, of course, that the conventional error recovery techniques are adequate to compensate for the failing DASD, as will be further explained.

The block 83*b* operates to divide the original data block of 522 bytes into three partitions of 174 bytes each in the same fashion as block 81*b*, previously described. The program continues with block 83*c*, which writes the data to the selected DASD array in the same fashion as block 81*c*, previously described. The write operation of block 83*c* proceeds as if the defective DASD were actually performing properly, and ignores the fact that it is not performing correctly.

The test at block 83*d* is to determine if there were any write or track seek errors. If this test follows the NO branch, the program performs the test at block 83*k* to determine if there are any more sectors which remain to be written. Returning to block 83*d*, if a write or track seek error occurs, the program branches to block 83*e*, which performs the error recovery procedures in the same fashion as block 81*e*, previously described.

Block 83*f* then examines the result of the error recovery procedures to see if there are any uncorrected errors. This block follows the same procedure as that of block 81*f*. If all errors have been corrected, the NO branch is followed and the program proceeds to block 83*k*, which compares the sectors specified by the write command with the number of sectors written. If there are more sectors to write, the program follows the YES branch and loops back to block 83*b*. If all sectors have been written, the NO branch is used and the program proceeds to block 82*a*, which signals the completion of the write command and the availability of the storage subsystem for the execution of further commands.

If the error recovery procedure of block 83*f* is unsuccessful in recovering from the error detected in block 83*d*, the program follows the YES branch to block 83*g*, which signals a hard write error, i.e., unrecoverable, and adds the DASD which generated the error to the Degraded DASD List. The program then reenters the mainline program at block 81.

Figure 9:
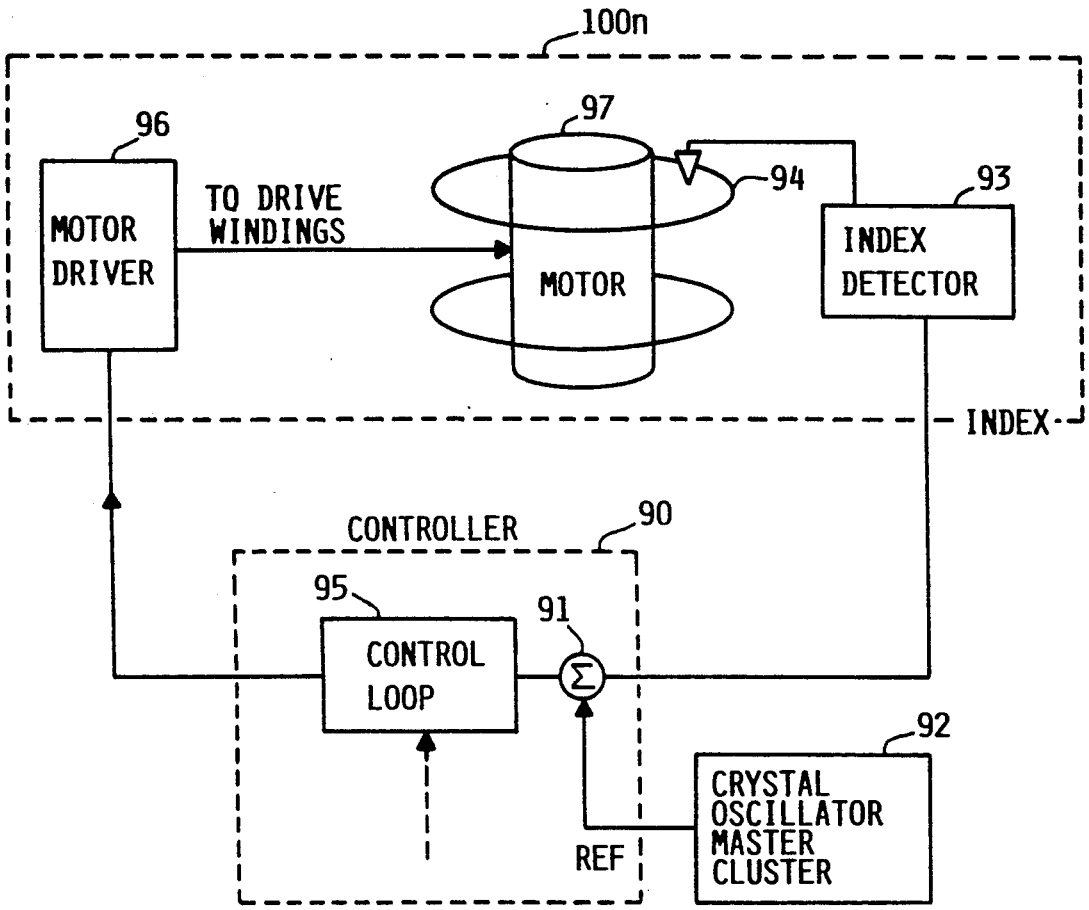
FIG. 9 is a data flow chart of the portion of the program used to control the spindle drive motors.

FIG. 9 shows the system for controlling the spindle motors of the individual DASD units. As previously described, the DASDs are arranged in arrays of four DASDs. The arrays are combined into clusters of any number of arrays. In the preferred embodiment, each array is made up of four DASDs. Partitioned data is written into the array four units bits at a time, that is, one unit from each of the data partitions and the corresponding parity unit (block) are written on four disks at the same time. Since the reading is also done in parallel, the rotational position of all four disks of the array must be kept in precise relation to each other. If this were not done, the system performance would be degraded. That is, a read operation would require waiting until the last DASD has passed the data. It is therefore very desirable that the four DASDs rotate at the same speed and, additionally, acquire a predetermined positional relationship with each other and maintain this relationship throughout operation of the storage subsystem.

The difficulty of this task can be appreciated by considering the number of bits recorded on a track, i.e., bit density, and recognizing that the position of the disks must be maintained to the tolerance of one bit position. The requirement for this level of accuracy can be relaxed by providing a first-in first-out type of read buffer for each of the DASDs. The size of the buffer is most conveniently set to accommodate slightly more than a single sector. A small skew between the various DASDs can be corrected by synchronizing the data at the time it is read from the buffers. While this approach will solve the skew problem and relax the rotational position tolerance to which the DASDs are held, it does so at the expense of additional delay. This is due to the fact that the system must wait until the last disk has brought the addressed data under the read head before the data can be used. In the usual situation, this delay is orders of magnitude less than the normally encountered latency in a DASD operating at 3,600 RPM. The buffer induced delay would be only the time required for the disk to move several bit positions. The actual delay is further reduced by the fact that the disk is rotating approximately three times as fast as a normal DASD.

In FIG. 9, each DASD 100*n* has a speed/position controller 90, which is located in the array/cluster controller 5 of FIG. 1. Each speed/position controller 90 has a control loop 95 which is effective to compare the position of an index pulse from the DASD with a reference proved to all controllers 90 in the summer 91. In the usual case, the reference index pulse will be generated in the array/cluster controller 5 by a crystal controlled oscillator 92 and will represent the optimum time for the occurrence of the index pulse when viewed from the standpoint of the storage subsystem and the associated data processing system.

The index detector 93 provides an index pulse every time the index mark on disk 94 passes. This provides a measure of the speed and position of the disks in DASD 100*n*. The index pulse from index detector 93 and the reference pulse from crystal reference oscillator 92 are compared at the summer 91 and the resulting error signal is sent to the control loop 95. The preferred embodiment utilizes digital technology for the implementation of control loop 95, however, the actual implementation of control loop 95 may be in either analog, digital, or hybrid technology. Suffice to say that it operates to develop a signal to the DASD motor drive circuitry 96 which energizes the windings of DASD spindle drive motor 97. The control loop is effective to bring the speed of the DASD 100*n* to precisely that defined by the crystal reference oscillator 92 and to the position the disks of DASD 100*n* so that the index pulse passes the index detector at precisely the correct time, thereby providing positional synchronism between all DASDs. If one DASDs disk position is slightly behind the position of the others, the control loop 95 may cause the speed of the lagging DASD to be slightly accelerated, even though it is rotating at the correct speed, until the proper position is reached, at which time the speed will be slowed to conform to the other DASDs and maintain the proper position.

Figure 10A:
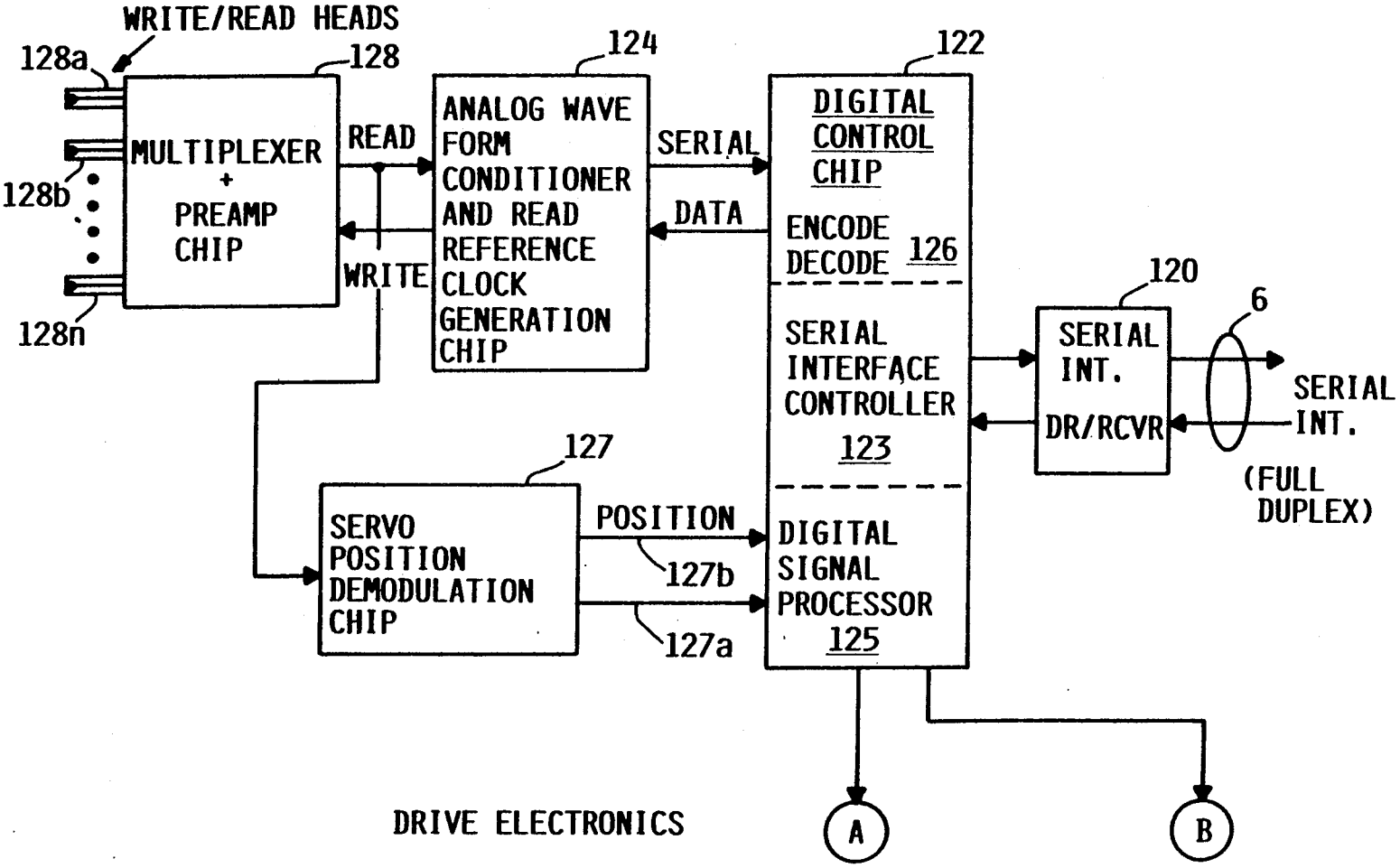
FIGS. 10A and 10B are a schematic schematic drawing of the system electronics utilized by the storage subsystem controller.
Figure 10B:
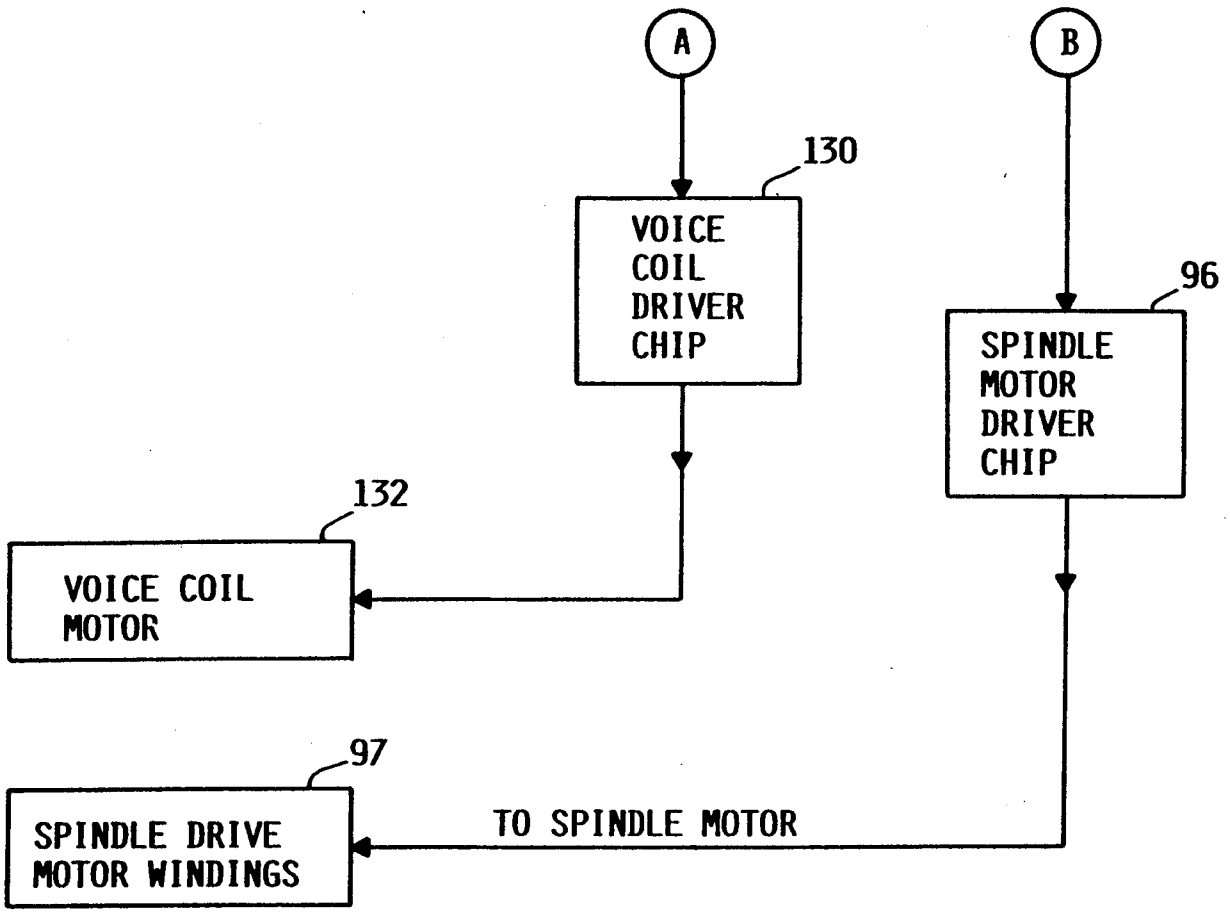

A more comprehensive showing of the electronics used in array/cluster controller 5 is shown in FIG. 10. Communication with the central processing unit is conducted over the serial interface 6, which leads to serial interface driver/receiver chip 220, located in the array/cluster controller 5. A digital control chip 22 includes a serial interface controller portion 123 which is directed to the control of the serial interface between array/cluster controller 5 and data processing system 2. The serial interface controller provides the appropriate synchronization, buffering and decoding of all data and control signals passed between data processing system 2 and array/cluster controller 5.

The servo demodulator chip 127 reads analog, servo data written on the disks from the read line 138*a* and provides a digital representation of disk position on bus 127*b*.

Digital control chip 122 also includes a digital signal processing portion 125 which responds to the read head position data on bus 137*a* representing the second output of servo demodulator chip 127. The signals on bus 127*a* are processed to provide the control signals to voice coil driver chip 130 which functions to energize the windings of the voice coil type motor 132 of the actuator associated with the head arm assembly of the DASD. The servo demodulator chip 127, the digital signal processor portion 125 of the digital control chip 122, and the voice control driver chip 130, operate to energize the voice coil driver windings in a fashion such that the head arm assembly is moved to position the read/write head over the addressed track and maintained in the proper position to allow data to be written and read from the track.

In addition, the servo demodulator chip 127 performs the function of the index detector and passes an index signal to digital signal over line 127*b* processor 125. The index signal is compared to the crystal reference oscillator as described with reference to FIG. 9, and the appropriate drive signal is sent to spindle motor drive chip 96 from which the appropriate drive signals are generated and sent to the spindle drive motor windings 97 as described with reference to FIG. 9.

Digital control chip 1 22 further includes an encode/-decode portion 126 which serves to decode the data read from the DASD disk and induce the data to be recorded on the DASD disk. The data to be recorded is passed to analog waveform conditioner chip 124 which takes the digital form and converts it to the appropriate analog waveform for transmission to the selected one of read/write heads 128*a*, 128*b*, . . . 128*n*, through multiplexor chip 128. When reading data from the DASD disk, the analog signal is selected from one of heads 128*a*, 128*b*, . . . 128*n* and amplified by multiplexor chip 128 and passed to the analog waveform and clock generator chip 124 where it is conditioned and digitized. A phase locked clock signal is extracted from the read data and provided with the digitized read data to the encode/decode portion 126 of the digital control chip 122, which then converts to digital form for transfer to the serial interface controller portion 123 of digital controller chip 122.

Figure 12A:
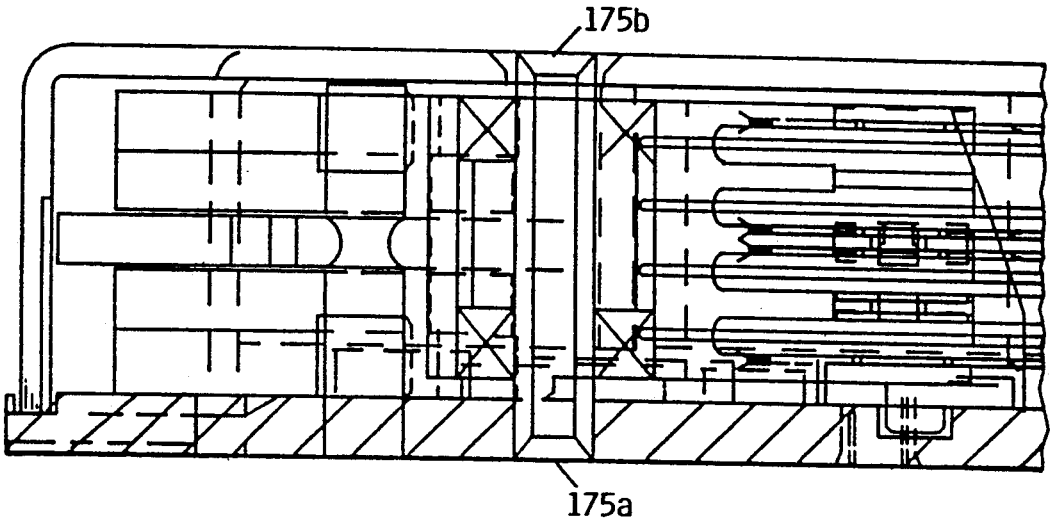
Figure 12B:
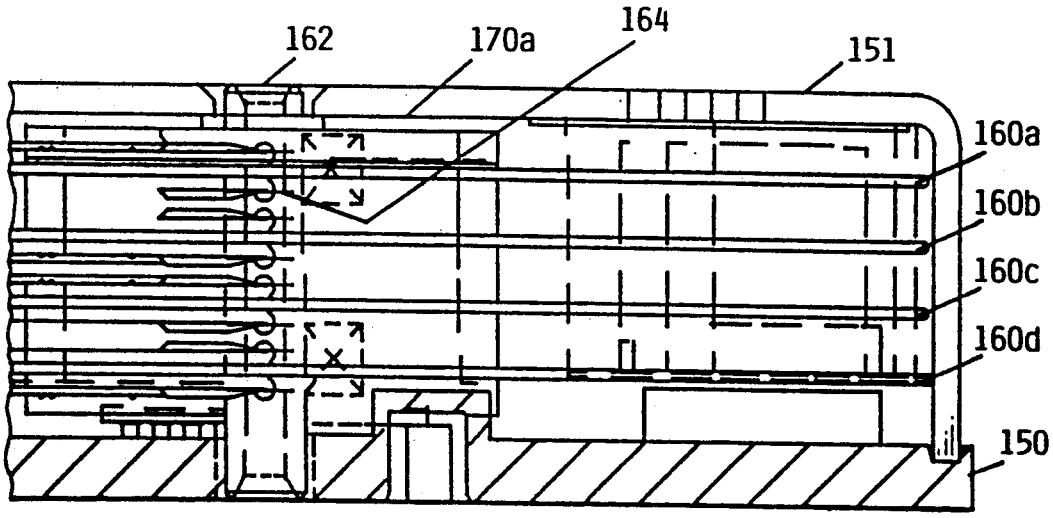

Having thus explained the electrical and system aspects of the invention, attention is now directed to FIG. 11, which is a plan view of one of the DASDs used in the storage subsystem, and FIGS. 12A and 12B, which are partial sectional side views along the line XII—XII of the DASD as shown in FIG. 11. Where possible, the element being described is shown on both fiqures and identified by the same reference character. The base plate 150 and cover 151 combine to provide a seal for the components of the DASD located within the resulting enclosure.

A plurality of disks 160*a*, 160*b*, 160*c* and 160*d*, having a nominal diameter of 65 mm are positioned for rotation on spindle assembly 162, supported at one end by base plate 150 and the other end by cover 151. Incorporated as a portion of spindle assembly 162 are the spindle drive motor 164, spacers 213 and clamp 212 to retain disks 160*a*, 160*b*, 160*c*, and 160*d* in proper position. Spindle assembly 162 is described in detail with reference to FIG. 14.

Each of the surfaces of disks 160*a*–160*d* is coated with an appropriate magnetic recording material for recording data. As shown in FIG. 13*b*, a plurality of magnetic transducers 170*a* and 170*a'* through 170*d* and 170*d'* are positioned to coact with the upper and lower coated surfaces of disks 160*a* through 160*d* for reading and writing data. The recording heads 170 are mounted at the ends of their respective suspension assemblies 171*a* and 171*a'* through 171*d* and 171*d'*. The suspension of heads 170 follows conventional gimbal design to allow the head to float approximately 6.5 microinches (0.165 microns) above the disk surface during operation of the system.

Again with reference to FIG. 11, each DASD assembly includes a connector 169 carrying all the required power and signal line to the DASD.

With reference to FIG. 13A, each of the head/suspension assemblies is affixed to a corresponding arm 173*a*–173*e* of comb assembly 173. The comb assembly 173 is positioned for rotation about bearing cartridge 175. Bearing shaft ends 175*a* and 175*b* extend through and are bonded to base plate 150 and cover 151 for double end support of bearing 175 and assist in retaining cover 151 in engagement with base plate 150. An actuator winding, consisting of drive coil 176, is mounted between projections 173*k* on the end of comb assembly 173 opposite the arms 173*a*–173*e*.

When coil 176 is energized with direct current of either polarity, the current within drive coil 176 coacts with the magnetic field of the permanent magnet assemblies 177*a* and 177*b*, which are respectively fixed to the cover 151 and base 150, to cause the comb assembly to rotate about bearing 175 and position the heads 170 over the desired tracks on disks 160 and maintain them in correct position over the track during reading and writing data. The magnet assemblies 177*a* and 177*b* each include a pair of permanent magnets 177*a*1 and 177*a*2 and 177*b*1 and 177*b*2, which are mounted on base members of soft magnetic material 177*a*3 and 177*a*4, respectively. The base members provide a low reluctance path which completes the magnetic circuit seen by the drive coil 176 and improves the efficiency of the magnetic actuator drive. A pair of crash stops 178*b*, each having an elastomeric cushion 178*c* and 178*d* at the midpoint, serve to prevent the comb from traveling beyond acceptable limits. A flexible cable assembly 179 provides the requisite connection to the magnetic heads 170 and the drive coil 176.

The spindle assembly 162 shown in FIG. 14 includes a shaft 190 the ends of which mate with corresponding holes provided in base plate 150 and the cover 151 and are bonded thereto to support the shaft at both ends. By supporting the shaft at both ends, the tilting and vibration problems associated with the so-called "tower" mount are totally avoided, and the resulting assembly is virtually vibration and resonance free. A pair of bearings 191 and 192, affixed to the shaft 190 provide support for the disk drive motor pole 193 and allows it to rotate about the fixed shaft 190.

A set of windings 194, affixed to the shaft 190, is energized with the drive current to cause a rotating magnetic field. The rotating magnetic field coacts with the permanent magnets 200 mounted on the interior face of steel pole 193, to cause the pole to rotate. A steel spacer 201 engages the bearing 192 and supports the lower portion of pole 193. An aluminum hub 210, affixed to the outer surface of pole 193 has a smaller outer diameter than the inner diameter of the disks 220 to allow for thermal expansion. The disks 220 and spacers 213 are centered about shaft 190 and held in position on hub 210 by a clamp 212.

FIG. 15 illustrates the fashion in which four of the DASDs 230*a*, 230*b*, 230*c* and 230*d* are mounted on a single pluggable card 231. Each such card 231 therefore comprises a single array and a plurality of such cards makes up the cluster. The card 231 is made from conventional printed circuit material and includes lands, not shown, extending from the contact tongue 232 to the individual DASDs. Each of the individual DASDs 230 are connected to the card 231 through plugs 235*a*–235*d*.

The manner of securing the DASDs 230*a*–230*d* to card 231 is illustrated in FIG. 16. Each DASD, such as represented by DASD 230*a*, position includes keyhole slots 238*a*, 238*b* and 238*c*. These slots line up with corresponding elastomeric shock mount grommets 239*a*, 239*b* and 239*c* and their associated plugs 234*a*, 234*b* and 234*c* not visible on the DASD 230. Electrical connection of DASD 230*a* is made by means of socket 241*a*, described in more detail with reference to FIG. 17.

FIG. 17 shows the arrangement of the DASD plug 230*a* and shock mount 240 in more detail. The DASD 230*a* is held in engagement with printed circuit card 231, but mechanically isolated by elastomeric shocks 239 associated with the card 231 by means of the shock mounting 240. Each DASD 230*a*–230*d* includes three shock mounts 240, each having a ferrule pin 242 through the middle and a screw portion 243 which retains the elastomeric grommet 239 to the base 150. The shockmount type grommet 239 has a conventional shape which includes an annular slot 239*a* in the periphery to accommodate the shoulder of the key slots 238*a*, 238*b* and 238*c* in the printed circuit card 231. The DASDs 230*a*–230*d* are mounted on the card 231 by inserting the grommets 239 into the large portion of the key-shaped slots 238*a*, 238*b* and 238*c* in the card 231. The DASD 230*a* is then moved to push the annular grommet slot 239*a* into the narrower portion of the key-shaped slots 238*a*, 238*b* and 238*c*. The DASDs 238*a*–230*d* are retained in the smaller portion of the key slots 238*a*–238*c* by insertion of plug 234 into the larger portion of the key-shaped slots.

The mechanical mounting of the DASD 230*a* which has just been described is relatively simple and not only provides an easy to use arrangement, but also accommodates the requirement for a large number of electrical contacts between the DASDs 230*a*–230*d* and the card 231. The dual requirement for mechanical isolation and electrical connection between pluggable components of a system has commonly been satisfied in the past with fixed shock mounts and pluggable cables. This approach taken in the mounting of so-called hard drives in most personal computer systems. This duality leads to the increased chance for error, as, for example, the failure to make the requisite cable connection after completion of the mechanical mounting. This means that the computer must be partially disassembled to correct the mistake. Additionally, cables are prone to wiring mistakes and add to the cost of a system.

As shown in FIG. 17, the pluggable connector 169 of DASD 230 is configured to allow it to be positioned abutting, but clear of, the aperture leading into the socket 241. As the DASD is moved to position the shock mount elastomeric grommets 239 in the narrow portion of the keyhole slots, the connector 169 moves into the aperture of socket 241 in a fashion which causes the lands on connector 169 to make contact with the corresponding contacts in the socket 241. Socket 241 includes plate 235. Since conventional sockets would not provide mechanical isolation between the DASD 230*c* and card 231, a novel arrangement is provided. Electrical connection between the lands of the connector 169 and the corresponding lands on card 231, for example, lands 245 and 256, is provided by the springs 247 and 248. Positioning of the socket during insertion is provided by the two pins 260 which include retaining washers 260*a* which allow the pins 260 to float in oversized holes in card 231. This prevents excessive movement during insertion of the DASD connector 169, but then disengages to mechanically isolate DASD 230*a* from card 231.

An important advantage of the invention is the ability to remove a DASD which has failed and replace it with an operative unit without the need for powering down the system before making the replacement and then powering the system back up after making the replacement. This mode of operation is aptly termed "hot plugging". In FIG. 18, the mechanical aspects of the hot plugging capability are illustrated. Each of the DASD arrays 300 is provided with a card 301 having a plug contact portion 302 containing a plurality of contact lands for signals and power. The lands on the plug contact portion 302 coact with corresponding contacts on the socket 310, affixed to the frame of the data processing system. To allow the DASDs to be plugged with the power at the socket 310, each of the lands 320 are physically shorter than the power lands 321 and 322. This ensures that the circuits in DASD 300 and the circuits in the array/cluster controller will not receive spurious signals during the plugging operation. If the signal and power circuits were to be connected in intermixed or simultaneous fashion, spurious signals could be generated which would lead to errors in the array/cluster controller or, worse, in the data processing system. By ensuring that the circuits in DASD 300 are properly supplied with power before the signal connections are made, the generation of spurious signals is avoided. The mechanical arrangement of the lands on plug 302 physically prevents contact to the signal lands until after the power lands are connected. During insertion, the time delay between making the power contact and the signal contact ensures that all circuits are properly powered and thereby prevents generation of erroneous signals.

What is claimed is:

1. A disk storage drive comprising:

a. at least one hard disk having a substrate nominal diameter of less than 85 mm, and a recording medium including a coating of magnetic material thereon having a plurality of data tracks suitable for magnetic recording;

b. spindle drive means for rotating said disk at an operating speed greater than 5,500 RPM;

c. transducer means for coaction with said magnetic material for reading and recording data; and, d. actuator means for positioning said transducer means over a selected one of said plurality of said plurality of data tracks on said disk.

2. A disk storage drive according to claim 1 wherein said diameter has a nominal value of 65 mm.

3. A disk storage drive according to claim 2 wherein said hard disk has a nominal thickness of 25 mils.

4. A disk storage drive according to claim 3 wherein said spindle drive means rotates said disk at a nominal operating speed of 10,000 RPM.

5. A disk storage drive according to claim 2 wherein said spindle drive means rotates said disk at a nominal operating speed of 10,000 RPM.

6. A disk storage drive according to claim 1 wherein said hard disk has a nominal thickness of 25 mils.

7. A disk storage drive according to claim 3 wherein said spindle drive means rotates said disk at a nominal operating speed of 10,000 RPM.

8. A disk storage drive according to claim 1 wherein said spindle drive means rotates said disk at a nominal operating speed of 10,000 RPM.

9. A disk storage drive according to claim 1 wherein said hard disk substrate is made of glass.

10. A disk storage drive according to claim 1 wherein said hard disk substrate is made of semiconductor grade silicon.

11. A disk storage drive according to claim 1 wherein said hard disk substrate is made of ceramic material.

12. A disk storage drive according to claim 1 having nominal external dimensions corresponding to 0.25 of a standard 5¼" disk drive.

13. A disk storage drive according to claim 1 wherein said nominal external dimensions are 0.8125"×4"×2.875".

14. A disk storage system comprising N drives according to claim 1, wherein N is an integer greater than 1, wherein data stored therein in interlaid fashion is recorded on said recording medium in first through N−1 of said drives and parity information for said recorded data is recorded on said recording medium in the Nth of said drives.

15. A disk storage system according to claim 14 wherein N=4.

16. A disk storage system according to claim 14 further including control means for receiving blocks of data to be stored in said system, converting received data blocks into corresponding N−1 partitions plus a corresponding parity partition and storing each of said N partitions on a respective one of said N disk drives.

17. A disk storage system according to claim 16 wherein N=4.

18. A disk storage system according to claim 17 wherein said control means includes regeneration control means for reading corresponding data and parity partitions from each of said four drives and converting said partitions into the data originally stored.

19. A disk storage system according to claim 18 wherein said control means further includes parity check means, responsive to the data partitions recorded on the recording medium in three of said drives and the parity information recorded on a fourth of said drives for performing a parity check on said data read from said drives.

20. A disk storage system according to claim 18 further including error correction means responsive to the corresponding data bits contained on any three of said drives for regenerating the data originally stored.

21. A disk storage system according to claim 17 wherein said control means further includes:

a. disconnect signalling means for detecting the disconnection of any one of said four drives from said system and generating a disconnect signal indicating which of said drives has been disconnected;

b. connect signalling means for detecting the reconnection of any one of said four drives to said system and generating a reconnection signal indicating which of said drives has been reconnected; and, e. regeneration means responsive to said disconnect signal and to said reconnect signal for reading corresponding data or parity partitions from three of said drives which remain connected, regenerating the data or parity partitions originally resident on said disconnected drive and recording said regenerated partition on said reconnected drive.

22. A disk storage system according to claim 21 wherein said control means further includes means for disabling said system in response to said disconnect signal.

23. A disk storage system according to claim 22 wherein said control means further includes means for enabling said disabled system in response to said reconnection signal.

24. A hard disk storage system according to claim 14 further including:

a. means responsive to each of said spindle drive means for generating spindle speed error signals indicating the phase difference between the respective rotational positions of the disks of each of said drives; and, b. spindle drive control means responsive to said error signals for electronically locking the rotational speed and relative position of the disks of said drives whereby data recorded in interlaid fashion on the respective recording mediums of said N drives may be simultaneously accessed for reading and recording.

* * * * *